United States Patent [19]
Crompton, Jr. et al.

[11] Patent Number: 6,124,403
[45] Date of Patent: Sep. 26, 2000

[54] THERMOPLASTIC FLUOROPOLYMER CONTAINING ELASTOMER AND PRODUCTION PROCESS THEREFOR

[75] Inventors: John Russell Crompton, Jr., Middletown; Charles Winfield Stewart, Sr., Newark; Robert Clayton Wheland, Wilmington, all of Del.

[73] Assignee: E. I. du Pont de Nemours and Company, Wilmington, Del.

[21] Appl. No.: 09/138,511

[22] Filed: Aug. 24, 1998

Related U.S. Application Data

[60] Provisional application No. 60/056,976, Aug. 26, 1997.
[51] Int. Cl.$^7$ .......................... C08F 253/00; C08F 291/02
[52] U.S. Cl. ............................................. 525/276; 525/903
[58] Field of Search ...................................... 525/276, 243

[56] References Cited

U.S. PATENT DOCUMENTS

| | | | |
|---|---|---|---|
| 4,155,953 | 5/1979 | Tatemoto et al. | 525/244 |
| 5,292,816 | 3/1994 | Metz et al. | 525/276 |
| 5,385,981 | 1/1995 | Krugger et al. | 525/276 |
| 5,756,199 | 5/1998 | Kerbow et al. | 428/327 |

*Primary Examiner*—Jeffrey C. Mullis

[57] ABSTRACT

Polymer compositions containing a mixture of an elastomer and a fluoropolymer can be made by diffusing fluorinated olefins and free radical initiators in preferably swollen elastomers and polymerizing the fluorinated olefins. The resulting compositions have useful properties, such as reduced sliding friction, which makes them useful for seals in contact with moving surfaces, and for other uses.

21 Claims, 1 Drawing Sheet

ശ്രീ6,124,403

THERMOPLASTIC FLUOROPOLYMER CONTAINING ELASTOMER AND PRODUCTION PROCESS THEREFOR

This application claims priority benefit of U.S. Provisional Application No. 60/056,976, filed Aug. 26, 1997.

FIELD OF THE INVENTION

This invention concerns a polymerization process wherein a free radical initiator is diffused into an elastomer and is used to initiate the polymerization of a fluoroolefin that is polymerizable with that free radical initiator. This produces a composition which is a mixture of the elastomer and the fluoropolymer produced in which the distribution of fluoropolymer in the elastomer is novel, and which also has improved properties, such as reduced moving surface friction.

TECHNICAL BACKGROUND

Elastomers of all types, and especially fluoroelastomers, are used for a variety of purposes. In these uses various properties are important, such as heat resistance, and chemical resistance. In many uses, such as in seals for moving parts, sliding frictional characteristics are also important, and many elastomers have high coefficients of sliding friction, which is undesirable. Thermoplastics, especially fluoroplastics have lower resistance to sliding, but typically do not have sealing properties as good as elastomers. Therefore, materials which combine the characteristics of these two types of polymers are sought.

SUMMARY OF THE INVENTION

This invention concerns a process for making a polymeric composition, comprising, diffusing into an elastomer a free radical initiator and at least one fluorinated olefin whose polymerization may be initiated by said free radical initiator, and heating said elastomer to cause initiation of polymerization of said fluorinated olefin.

This invention also concerns a shaped part, comprising, an elastomer and a thermoplastic fluoropolymer, wherein a concentration of said thermoplastic in said elastomer changes as a distance from a surface of said shaped part increases, and wherein said thermoplastic fluoropolymer is about 0.1 to about 50 percent by weight of the total of said elastomer and said thermoplastic fluoropolymer in said shaped part.

Also described herein is a shaped part, comprising, an elastomer and thermoplastic fluoropolymer, wherein said thermoplastic fluoropolymer does not have a melting point when said melting point is measured by differential scanning calorimetry, or said melting point is shifted at least 30° C. from its value when measured on thermoplastic fluoropolymer alone, and a shaped part, comprising an elastomer and thermoplastic fluoropolymer in which said thermoplastic fluoropolymer is simultaneously present at a surface with a characteristic melting point, and is also present below the surface, wherein said thermoplastic fluoropolymer below the surface does not have a melting point when said melting point is measured by differential scanning calorimetry, or said melting point is shifted at least 30° C. from its value when measured on thermoplastic fluoropolymer alone.

DETAILS OF THE INVENTION

Figure 1:
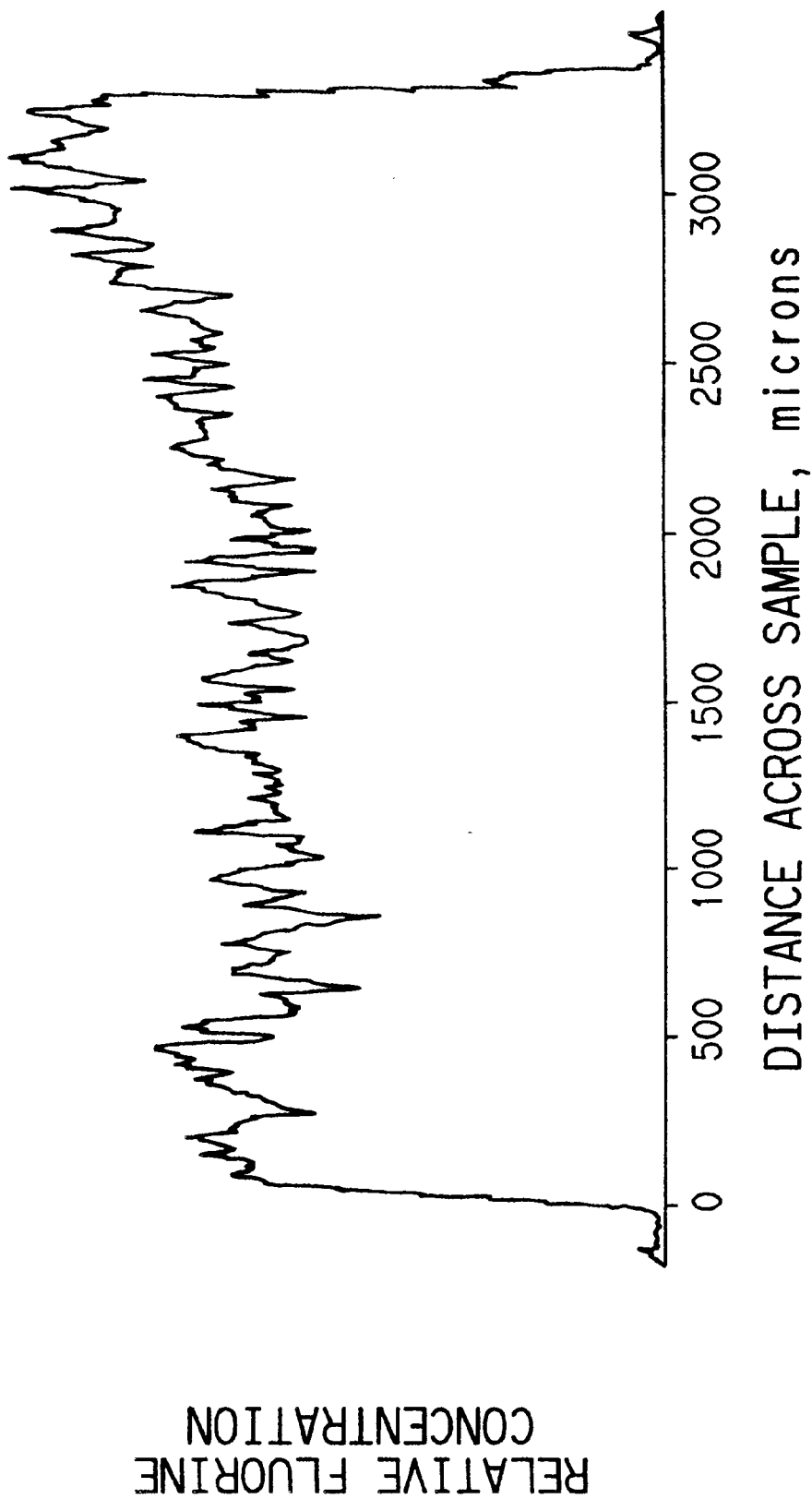
FIG. 1 is a graph showing relative fluorine concentration over the distance across a sample in microns.

By a thermoplastic is meant a polymer that has a heat of fusion of at least 1 J/g, preferably at least 5 J/g, associated with a melting point (Tm) of more than 35° C., and/or a glass transition temperature (Tg) of more than 35° C., when measured by the method of ASTM D-3417-83, but using a heating rate of 10° C./min. For all purposes herein for measurement by Differential Scanning Calorimetry (DSC), the melting point shall be taken as the peak of the melting endotherm, and the glass transition temperature shall be taken as the midpoint of the measured transition.

By an elastomer is meant a polymer that meets the heat of fusion and glass transition characteristics described below. An elastomer does not have a heat of fusion of more than 1 J/g, associated with a melting point of 35° C. or more, preferably 10° C. or more, when measured by Differential Scanning calorimetry using the method of ASTM D-3417-83, except using a heating rate of 10° C./min. The melting point shall be taken as the peak of the melting endotherm. Also the elastomeric polymeric portion or elastomeric polymer shall not have a glass transition temperature above 35° C., preferably not above 10° C. when measured using the method of ASTM D-3417-83, but using a heating rate of 10° C./min. The glass transition temperature shall be taken as the midpoint of the measured transition. However, if an elastomer is a so-called "thermoplastic elastomer" containing both elastomeric polymer segments and crystalline and/or glassy polymer segments, as long as the polymer of which the elastomeric segments are composed meet the above requirements for an elastomers, the polymer shall be considered an elastomer, even though it may have crystalline and/or glassy segments which meet the requirements for a thermoplastic polymer as given above.

For shifts in the Tm or Tg in the compositions of elastomer and thermoplastic fluoropolymer herein, the shifts refer to the difference between that measured in the polymer mixture and that measured for the elastomer or thermoplastic fluoropolymer (as appropriate) alone. It is suspected that these shifts, and/or the disappearance of the Tm may be due to the fact that often the thermoplastic fluoropolymer molecules are so uniformly distributed in the elastomer molecules that the thermal properties of one or both of them are changed.

Many different kinds of elastomers may be used in the process (and of course be in the final product) of this invention. For instance, fluorinated elastomers, silicone elastomers, hydrocarbon elastomers and urethane elastomers may be used. In some instances certain elastomers may not be useful in this invention. For instance, it is believed that certain elastomers may not allow the fluoropolymer to form because of excessive free radical chain transfer, or that impurities in the elastomer (such as compounds added to the elastomer or compounds made in a crosslinking reaction) may have the same effect. To test whether any particular elastomer sample may be useful, a simple test polymerization with the desired fluorinated olefin and free radical initiator may be done, as described in many of the Examples herein.

Preferred elastomers are silicone elastomers, fluorinated elastomers, and fluorinated elastomers are more preferred. By a fluorinated elastomer is meant any elastomer the contains fluorine which is bound to carbon. The fluorinated elastomers may be partially or completely fluorinated. One type of preferred fluorinated elastomer is an elastomer that has repeat units derived from at least two or more of vinylidene fluoride, hexafluoropropylene, tetrafluoroethylene (TFE), perfluoro(alkyl vinyl ethers) such as perfluoro (methyl vinyl ether), perfluoro(ethyl vinyl ether), perfluoro (propyl vinyl ether), vinyl fluoride, ethylene and propylene. Specific preferred fluorinated elastomers (designated by the monomers incorporated in them) are: vinylidene fluoride, hexafluoropropylene and optionally TFE; TFE and perfluoro (methyl vinyl ether); tetrafluoroethylene and propylene. All of these may optionally include small amounts of so-called curesite monomers; those containing curesite monomers are included in the above listing even though the curesite monomer is not specifically mentioned.

The elastomer initially added to the process may or may not be crosslinked (vulcanized), but it is preferred that it is crosslinked. Optionally the elastomer may be crosslinked during the fluorinated olefin polymerization process (many elastomers may be crosslinked by free radicals) or after the fluorinated olefin is polymerized. Optionally the elastomer may not be crosslinked at all. In one preferred embodiment the fluoroolefin polymerization process is carried out on a crosslinked elastomer in the form of a shaped part, that approximates the final shape and dimensions of the final desired part. It will be understood that polymerization of the fluorinated olefin inside and on the surface of the elastomer usually results in some volume increase in the elastomer (part).

The product of the process may be a shaped part. The shaped part maybe a "final" shaped part, meaning essentially no further shaping or size change is needed before use, or it may be a preform. By a preform is meant a part that is nearly the final shape needed, or that much change is not needed to the shape to form the final part. Preforms are usually not crosslinked before forming the final shape. For instance the preform may be in the form of a circular cross section rod which may be cut to length, formed into a circle, and then formed (and crosslinked) into an O-ring or chevron ring.

By a fluoroolefin is meant any compound which contains at least one fluorine atom and an olefinic carbon-carbon double bond. It is preferred that at least one fluorine atom in the fluorinated olefin be a vinylic fluorine atom, i.e., is bound to a carbon atom of the carbon-carbon double bond. Useful fluorinated olefins include tetrafluoroethylene (TFE), hexafluoropropylene, vinylidenie fluoride, chlorotrifluoroethylene, perfluoro(alkyl vinyl ethers) such as perfluo(propyl vinyl ether), perfluoro(methyl vinyl ether), perfluoro(ethyl vinyl ether), 3,3,3 -trifluoropropene, vinyl fluoride, and trifluoroethylene. Although some of these fluorinated olefins may be homopolymerized, some may only readily copolymerize when other olefins are present. Such relationships are know in the art, see for instance H. Mark, et al., Ed., Encyclopedia of Polymer Science and Engineering, Vol. 16, John Wiley & Sons, New York, 1989, p. 577–648. Preferred fluorinated olefins (alone or in combination) are tetrafluoroethylene, hexafluoropropylene, vinylidene fluoride, chlorotrifluoroethylene, perfluo(propyl vinyl ether), perfluoro(methyl vinyl ether), and perfluoro (ethyl vinyl ether), while TFE, and/or a combination of TFE and chlorotrifluoro ethylene and TFE and/or a combination of TFE and perfluoro(propyl vinyl ether) are especially preferred. In a more preferred polymerization TFE is used alone to produce polytetrafluoroethylene (PTFE) as the fluorinated polymer in the final composition.

Other non-fluorinated olefins may also be used to copolymerize with one or more of the fluorinated olefins. Such copolymerizable olefins are known in the art, see for instance H. Mark, et al., Ed., Encyclopedia of Polymer Science and Engineering, Vol. 16, John Wiley & Sons, New York, 1989, p. 577–648. Such useful olefins include ethylene, and propylene.

The polymer resulting from the polymerization of the fluorinated olefin(s) and any other olefin (if present) may be an elastomer or a thermoplastic, but it is preferred that it be a thermoplastic. If it is a thermoplastic it is preferred that it have a melting point of about 200° C. or more when measured on the thermoplastic fluoropolymer alone. Some combinations of the same olefins may be elastomers of thermoplastics, depending on the molar ratio of the olefins in the polymer produced.

The free radical initiators for the fluorinated olefin polymerization are those that are known to be useful for the polymerization of the olefins chosen for use in the process. Such initiators (and the temperatures at which they are active initiators) are known in the art, see for instance J. Brandrup, et al., Ed., Polymer Handbook, $3^{rd}$ Ed., John Wiley & Sons, New York, 1989, p. II/1 to II/65. Useful types of initiators include diacyl peroxides, dialkyl peroxides, azo compounds and peroxydicarbonates. Specific useful initiators include perfluoro(propionyl peroxide), HFPO dimer peroxide $[(CF_2CF_2CF_2CCHF(CF_3)C(O)O—)_2]$, and diisobutyryl peroxide, and HFPO dimer peroxide is preferred. The free radical initiators are used in amounts that are normally used in such fluoroolefin polymerization, except that in some cases, especially where chain transfer to the elastomer or impurities in the elastomer is expected to be extensive, somewhat higher amounts of the initiator may be useful. Optimum amounts for any given system may be determined by minimal experimentation.

In a sense, the process for the making the polymeric composition can be thought of as three steps, diffusing the free radical initiator into the elastomer, diffusing the fluorinated [and any other olefin(s)] into the elastomer, and carrying out the polymerization by heating the elastomer containing the initiator and olefin(s) to a temperature sufficient to cause free radicals to form and the polymerization to take place. Heating can simply mean warming towards ambient temperature when highly reactive initiators are used. Clearly both the initiator and olefin(s) must be present in the elastomer before the polymerization can take simultaneously or separately. It is preferred that the initiator be diffused into the elastomer first. Then the olefin(s) may be diffused in simultaneous with or before the polymerization is initiated.

It is believed that the initiator and the olefin(s) make their way into the interior of the elastomer by diffusion, but included within the meaning of diffusion herein are any other transport processes that may incidentally also be applicable. It is well known that diffusion of lower molecular weight substances through polymers is relatively slow. In order to get substantial amounts of initiator and/or olefin(s) into the elastomer in a reasonable amount of time, it is often preferred that the elastomer be swollen by a swelling agent which is a solvent or liquid that can swell the elastomer. Preferred swelling agents are those compounds which do not participate much in chain transfer reactions during the polymerization. Such compounds include highly fluorinated low molecular weight liquids such as 1,1,2-trichloro- 1,2,2-trifluoroethane, perfluoropropyl 1,2,2,2-tetrafluoroethyl ether, 2H,3H-perfluoropentane, and 1,1-dichloro-1-fluoroethane. It is preferred that the swelling agent be relatively volatile so that it may easily be removed after the desired polymeric composition is made. The swelling agent may also be one or more of the fluoroolefins, which of course acts as a swelling agent which is also polymerized. These liquid fluoroolefins may be used to help diffuse the free radical initiator into the elastomer.

The amount of swelling induced in the elastomer is not critical, a typical useful range being up to about 400 percent by weight swell. All other things being equal, usually the more swell induced in the elastomer, the more newly formed fluorinated polymer will be present in the final polymeric composition.

The desirability of preswelling an elastomer with solvent depends upon the elastomer's structure and additive package. While solvent preswelling is often unnecessary with clean, reactive systems such as the copolymer of TFE and perfluoro(methyl vinyl ether), in less active systems such as the copolymer of vinylidene fluoride, hexafluoropropylene and optionally TFE, and silicone rubber frequently preswelling for purposes such as increasing fluoroplastic weight gains or allowing the polymerizations to be run at atmospheric pressure and ambient temperatures is often desirable. Here, all other things being equal, usually the more swell induced in the elastomer, the more newly formed fluorinated polymer will be present in the final polymer composition. Swelling can be used to systematically control the amount of fluorinated thermoplastic polymerized into an elastomer. For example in the case of a vinylidene fluoride/hexafluoropropylene copolymer, a graph showing extent of swelling after 1 h versus solvent mixture composition (swelling with $CF_3CFHCFHCF_2CF_3$ mixed with relatively non-swelling $CF_3CF_2CF_2OCFHCF_3$) may be generated, which allows one to predict the weight percent swelling. A second graph showing weight percent solvent swell versus weight percent PTFE gain under a specific set of polymerization conditions may also allow one to reproducibly obtain desired compositions.

The initiator, which is usually a solid or a liquid may be conveniently added to the elastomer as a solution, whose solvent is also a swelling agent for the elastomer used. This not only readily transports initiator into the elastomer in a reasonable amount of time, but it also swells the elastomer for addition of the olefin(s) and optionally in the polymerization.

If the olefin(s) is a liquid, it may be added in the same solution as the initiator, and be allowed to diffuse into the elastomer at the same time as the initiator, preferably at a low enough temperature so that polymerization is not initiated while most of the initiator and/or olefin(s) are not inside the elastomer. Or alternatively, the initiator and liquid olefin(s) may be allowed to diffuse sequentially into the elastomer. In another sequence, polymerization may take place as the liquid olefin(s) is diffusing into the elastomer.

If the olefin(s) is a gas, it is preferred to allow the initiator to diffuse into the (swollen) elastomer, and then to expose the preferably swollen elastomer to the gaseous olefin(s) and then or shortly thereafter starting the polymerization by heating the elastomer. Exposure to, and diffusion into, the elastomer of the gaseous olefin may take place simultaneous with the polymerization taking place.

For gaseous fluorinated (or other) olefin(s) the pressure used in the diffusion (and perhaps while polymerizing) step will be a function of the particular process system used, and the amount of newly formed fluorinated polymer desired in the final polymeric composition. Generally speaking, the higher the amount of new fluoropolymer desired in the final product, the higher the pressure and/or the longer the polymerization time [with exposure to the olefin(s)], should be. However, other variables such as the initiator concentration may also affect this result.

The polymerization of the fluorinated olefin may conveniently be carried out in a bag, such as a bag made of a thermoplastic or thermoset polymer, which may be reinforced by reinforcing fibers or other materials. The bag should be reasonably resistant to the materials used in the process such as the fluoromonomer(s) and solvent (if used), and so is preferably made from a fluorinated polymer, more preferably is a thermoplastic fluoropolymer. The bag should preferably be inflatable, and/or transparent. The fluoroolefin, if gaseous, may be added once at the beginning, or be added continuously or intermittently as it is consumed (polymerized). The pressure inside the bag may be as desired, up to the pressure rating of the bag. A convenient upper limit is about 200 kPa (gauge).

The polymeric composition produced herein is essentially a mixture of a fluorinated polymer [produced by polymerization of the fluorinated olefin(s)] and the original elastomer. In some instances these two polymers may be grafted to each other. For the most part the fluorinated polymer is usually well dispersed in the elastomer, except for any fluorinated polymer which is polymerized on the surface of the elastomer, and for the most part any thick surface deposits of thermoplastic polymer are relatively easy to mechanically remove such as by shaking, dusting, or modest abrasion. The last layers of thermoplastic fluoropolymer, that is those that transition to the underlying thermoplastic fluoropolymer/elastomer network, can be difficult to remove, occasionally requiring abrasive removal and in a few cases cutting away of some of the underlying elastomeric substrate.

The amount of thermoplastic fluoropolymer deposited within the elastomer usefully varies from about 0.1 to 100% depending upon the end use application, the desired extent of physical property change, and the desired concentration profile of thermoplastic fluoropolymer within the bulk of the elastomer, all balanced, when necessary, with the importance of keeping dimensions unchanged. For example, where it is desired to alter surface friction of a preformed object with relatively little change in dimension, it is preferred that the final polymer composition contain about 0.2 to 10 wt % of thermoplastic fluoropolymer, more preferably about 0.5 to 3 wt % of thermoplastic fluoropolymer. These percentages are based on the total amount of original elastomer and newly formed fluorinated polymer present, and do include other materials which may be present such as fillers, reinforcing agents, pigments, antioxidants, etc. which may also be present.

The thermoplastic fluorinated polymer is rarely distributed evenly throughout the elastomer matrix because distributions are determined by a complex interplay of initiator diffusion, solvent diffusion, monomer diffusion, and polymerization. Considering, however, that all these diffusion processes originate at the surface of the elastomer, one would expect that the concentration of the fluorinated polymer in the final polymeric composition would be greatest at or near the surface of the elastomer, decreasing as the distance form the surface increased. While in fact this occurs in many instances, a variety of other nonuniform distributions have also been observed in which local maxima in thermoplastic fluoropolymer concentrations also occur well below the surface of the elastomer. The examples illustrate many of the possibilities. Interestingly the PTFE distributed below the surface in vinylidene fluoride/hexafluoropropylene (and perhaps TFE) copolymers (Viton®) does not appear to be particulate but rather molecularly dispersed on the basis of Differential Scanning Calorimetry (DSC) analyses in which there is no melting transition for subsurface PTFE and in some instances an altered glass transition for the elastomeric copolymer. The Viton® containing 37% PTFE in Example 5F and the silicone rubber square containing 56% PTFE in Example 1B look visually identical to virgin elastomer when cut and observed in cross section (no interior graying or white spots), which reinforces the data from the DSC.

The polymeric compositions described herein often have reduced surface friction, which makes them especially useful for seals or other places where objects rub against the polymers. They are also useful in static applications where the elastomeric part must be pushed against other objects to be put in place. They may be more easily seated with their lowered frictional properties. The above uses include shaft seals such as O-rings and chevron rings, and bottle stoppers.

However the presence of fluorinated polymer, especially if it is a high melting polymer, may improve the thermal properties of the elastomer by simply making it more chemically or physically stable to heat. For instance, many elastomeric parts need to be sterilized, and sometimes during the heating phase of the sterilization process elastomeric parts may stick together. A small amount of a high melting fluoropolymer, such as PTFE, especially near the surface of the elastomer part, may prevent such sticking.

The presence of the fluorinated polymer may also make the elastomer more chemically resistant, for instance by reducing swell in certain liquids. The Examples illustrate this property.

In the Examples the following abbreviations and tradenames are used:

Chemraz® 505 parts, available from Greene, Tweed & Co., Detwiler Rd., Kulpsville, Pa., believed to be principally a copolymer of TFE and perfluoro(methyl vinyl ether).

Corian® is available from E. I. du Pont de Nemours and Company, Wilmington, Del., U.S.A., principally methyl methacrylate polymer filled with alumina trihydrate.

Fluorel®, available from the 3M Co., St. Paul, Minn., U.S.A, believed to be a copolymer of vinylidene fluoride and hexafluoropropylene and perhaps TFE, parts obtained from Greene, Tweed & Co., Detwiler Rd., Kulpsville, Pa., probably filled with carbon black.

Freon® 113—1,1,2-trichloro-1,2,2-trifluoroethane.

Freon® E1—$CF_3CF_2CF_2OCFHCF_3$.

HFPOdP—$[CF_3CF_2CF_2OCF(CF_3)(C=O)O-]_2$

Mylar® Polyester Film, available from E. I. du Pont de Nemours and Company, Wilmington, Del., U.S.A.

PTFE—polytetrafluoroethylene

RT or rt—room temperature

Tedlar® polymer is available from E. I. du Pont de Nemours and Company, Wilmington, Del., U.S.A. and is poly(vinyl fluoride).

Viton® Fluoroelastomer, available from DuPont-Dow Elastomers, Wilmington, Del., U.S.A. is a copolymer of vinylidene fluoride and hexafluoropropylene and perhaps TFE, parts obtained from McMaster-Carr Supply Co. New Brunswick N.J., U.S.A, probably filled with carbon black.

In the Examples, all pressures are gauge pressures. Unless otherwise specified, all elastomers used herein were crosslinked beforehand.

In the Examples, friction was measured by attaching o-rings to the bottom of a weighted sled using double sided sticky tape and then measuring the force required to drag the sled horizontally across a surface of polished stainless steel. The stainless steel surface was provided by a 5.1×15.2 cm, 18 gauge, Type 304 or 302 stainless steel plaque having a bright annealed finish as called for in ASTM A666. The sled, a Corian® block measuring 5.1×5.1×1.3 cm, was topped with a 0.45 kg weight for the purpose of increasing sliding friction to a level easily measured. Since o-ring dimensions are affected by the newly formed fluoropolymer loadings, the o-rings were attached to the Corian® sled using double sided sticky tape. Forces were measured using a 1120 series Instron® Test Frame with a 90.7 kg (200 lb.) tensile load cell and a 50.8×15.2 cm platform designed for horizontal pulls on a specimen (Model 2810-005, Coefficient of Friction Fixture, Instron Corp.). The sled was attached to the Instron® load cell using Kevlar® aramid fishing line and an 45.7 cm (18") load cell adapter. Pulls (10.2 cm, 4") across the stainless steel surface were run at a rate of 5.08 cm/min (2"/min). Data were collected using a computerized program. Three numbers were measured: (1) the maximum starting force, (2) the average force required to maintain a steady drag rate of 5.08 cm/min per minute once steady motion had been achieved, and (3) the average difference between local maxima and minima as the sled moved across the stainless steel. This difference in local maxima and minima is observed visually as a series of small jerks as the sled moves across the stainless steel. The smaller the difference between the maxima and minima, the smoother the slide or the more stable the friction.

Caution—Many of the initiators used in these experiments are toxic. The polymeric composition should not be handled until the initiator has fully decomposed and the volatile products of decomposition removed. TFE can behave as a deflagrating explosive and is a suspected mild carcinogen.

COMPARATIVE EXAMPLE 1

Nonuniform TFE Polymerization into Untreated Chemraz® O-rings

Two #214 Chemraz® 505 o-rings (~25.4 mm I. D., 32 mm O. D, 3.2 mm thick, and weighing ~1.7 g, (obtained from Greene, Tweed & Co., Kulpsville, Pa., USA) were rinsed with Freon® 113 and air dried. They were chilled on dry ice and loaded into a chilled 400 ml autoclave. The autoclave was evacuated and 10 g of TFE added. Heating at 31–30° C. for 6 hours raised pressure within the tube to 858 kPa. The autoclave was finally vented and the o-rings recovered. Both o-rings were badly distorted out of round by dozens of irregular, pimple-like lumps welling up from the interior of the Chemraz®. O-ring thickness varied irregularly from ~3.38 to 3.68 mm. Where particularly large PTFE particles were formed within the Chemraz®, the PTFE erupted through to the surface showing white. Except for occasional eruptions of PTFE, the black visual appearance of the starting Chemraz® was retained. Weight gain was 0.1 to 0.2 grams. These o-rings would be of little use for the making of a seal, being no longer round, no longer flat, and lumpy all over.

EXAMPLE 1

Silicone Rubber with Interpenetrating PTFE

A crosslinked poly(dimethylsiloxane) believed to contain iron oxide and silica as pigment/filler was used. Based on Examples 1A to 1C below, TFE polymerization into the silicone rubber matrix appears to be maximized when the silicone has been preswollen with solvent. Comparison of Examples 1B and 1D that were thoroughly extracted with solvent prior to PTFE polymerization with unextracted Example 2A shows that such extraction is not necessary for a high level of PTFE polymerization.

A. Washed, Non-swollen Silicone Rubber Picks up 6% PTFE.

Three squares of red silicone rubber sheet were soaked in ~250 ml of Freon® 113 with magnetic stirring, the Freon® 113 being changed for fresh Freon® 113 once over four days. After drying under vacuum overnight the squares measured ~2.5 cm by 2.5 cm by 1.61 mm and weighed 1.5 g on average. The squares were soaked for 15 minutes in a −15° C. solution of ~0.16M HFPO dimer peroxide, [$CF_3CF_2CF_2OCF(CF_3)(C=O)O—$]$_2$, HFPOdP, in Freon® E1. The squares were taken out of the HFPOdP solution, briefly air dried, and then transferred on dry ice to a prechilled 400 ml autoclave. The autoclave was evacuated, pressured with 25 g of TFE, heated to 27.6 to 32.3° C. for 4–5 hours (TFE pressure 1.23 MPa-1.08 MPa), and vented. A very light and somewhat spotty coating of PTFE was visible on the surface of the silicone rubber squares. After knocking off obviously loose PTFE, the squares averaged 0.08 g heavier than at the start for an average weight gain of ~6%. Water gave a contact angle of 114+/−3°. Small pieces immersed in solvents such as n-butylamine and toluene swelled and even cracked over time, representative results being recorded below. X-ray fluorescence found a higher concentration of fluorine in the upper surface of the sample than would have been expected solely on the basis of PTFE weight gain. High PTFE surface concentrations in this and later silicone rubber samples is in agreement with electron microscopy results discussed later. The silicone samples became noticeably harder and stiffer with increasing PTFE content, an observation confirmed by Shore D hardness measurements.

Contact Angle, $H_2O$=114+/−3°

Weight Gain, 2 h @ r. t., n-butylamine=68%

Weight Gain, 168 h @ r. t. n-butylamine=53% badly cracked

Weight Gain, 2 h @ r. t, toluene=74%

X-ray Fluorescence: 31.7% F; 22.1% Si, 0.43% Fe

Shore D Hardness, ASTM D2240: 25±1

B. Washed, Swollen Silicone Rubber Picks up 56% PTFE.

Three squares of red silicone rubber sheet cut to the same size as in A, and averaging ~1.6 g each were soaked in ~250 ml of Freon® 113 with magnetic stirring, the Freon® 113 being changed for fresh Freon® 113 twice over five days. After brief air drying the three squares were still visibly swollen with Freon® 113 and found to weigh 4.3 grams on average. The squares were then soaked for 15 minutes in a −15° C. solution of ~0.16M HFPOdP in Freon® E1. The squares were taken out of the HFPOdP solution, briefly air dried, and then transferred on dry ice to a prechilled 400 ml autoclave. The autoclave was evacuated, pressured with 25 g of TFE, heated to 32.3 to 31.0° C. for 4–5 hours (TFE pressure 1.11–0.758 MPa), and vented. The three silicone rubber squares came back each with a crust of loosely attached PTFE on the surface. After rubbing off the loose PTFE with a spatula, the squares had an overall red appearance (with some persistent white traces of PTFE) similar to starting silicone rubber. After vacuum drying, their average weight was found to have increased ~56% to 2.5 g and their average dimensions to ~2.79 cm by 28.2 cm by 1.85–1.93 mm. In spite of the large weight gain and dimensional changes, when cut with a scissors, the cross section thereby created was visually identical to that of starting silicone rubber with no obvious graying or white spots.

Contact Angle, $H_2O$=114+/−3°

Weight Gain, 2 h @ r. t., n-butylamine=21%

Weight Gain, 168 h @ r. t. n-butylamine=23% no cracking

Weight Gain, 2 h @ r. t, toluene=25%

X-ray Fluorescence: 60.3% F; 0.64% Si, 0.17% Fe

Shore D Hardness, ASTM D2240: 35±1

One of the squares prepared here was cross sectioned and examined by electron microscopy after the PTFE crust had been knocked off. A high fluorine concentration was detected at one of the edges where apparently not all of the PTFE crust had been removed. Otherwise a high and fairly uniform fluorine content was observed across the sample with some choppiness that is likely the result either of silica particles or of a tendency for the fluoropolymer to clump as islands. When a fluorine, oxygen, and silicon map was done of a small area in WDS mode (Wavelength Dispersive Spectroscopy), silica particles, a very few as large as 5–6 μ, could be seen (high Si, O concentrations, no F) as well as a very few equally large areas of pure PTFE (high F, no Si or O). In addition to the coarse PTFE particles, a much finer graininess was also apparent in the fluorine concentration map that could be either an instrumental artifact or tiny islands of PTFE within the silicone rubber matrix instead of or in addition to true molecular mixing.

C. Unwashed, Swollen Silicone Rubber Picks up 13% PTFE.

Three squares of red silicone rubber sheet ~2.5 cm by 2.5 cm by 1.61 mm and averaging ~1.6 g were stirred magnetically with ~250 ml of Freon® 113 in ajar for 1 hour at RT. The three squares now swollen with Freon® 113 and weighing an average of 4.1 g, were soaked for 15 minutes at −15° C. in 0.16 M HFPOdP in Freon® in E1. The squares were taken out of the HFPOdP solution, briefly air dried, and then transferred on dry ice to a prechilled 400 ml autoclave. The autoclave was evacuated, pressured with 25 g of TFE, and heated at 41.9–39.6° C. for 4 to 5 hours, pressure ranging from 1.30 MPa at 23° C. during warm up to 786 kPa at the end. The three silicone rubber squares came back with a crust of loosely attached PTFE on their surface. After rubbing the loose PTFE off two of the squares with a spatula, they had an overall red appearance similar to starting silicone rubber except for some persistent white PTFE spots. After vacuum drying, the squares were found to have increased 13% on average in weight to 1.8 g and average dimensions to have increased to ~2.69 cm by 2.69 cm by 1.63–1.70 mm.

Contact Angle, $H_2O$=119+/−1°

Weight Gain, 2 h @ r. t., n-butylamine=62%

Weight Gain, 168 h @ r. t. n-butylamine=25% badly cracked

Weight Gain, 2 h @ r. t, toluene=64%

X-ray Fluorescence: 40.5% F; 16.5% Si, 0.40% Fe

Shore D Hardness, ASTM D2240: 28±1

The remaining silicone square with its PTFE crust still attached was cross sectioned and examined by electron microscopy. Relative fluorine concentration was measured as the cross section was scanned in EDS mode (Energy Dispersive Spectroscopy). Very high fluorine concentrations were observed as the pure PTFE crust attached to both sides of the silicone rubber was scanned. As soon as the interface was crossed to the silicone rubber, relative fluorine concentration dropped by ~90% and then increased again ~2× towards the center of the rubber. When fluorine, oxygen, and silicon maps are done of a small area in WDS mode (Wavelength Dispersive Spectroscopy), a very few silica particles 5–6 μ across can be seen (high Si, O concentrations, no F) as well as a very few equally large areas of pure PTFE (high F, no Si or O). In addition to the coarse PTFE particles, a much finer graininess was also apparent in the fluorine concentration map that could be either an instrumental artifact or tiny islands of PTFE within the silicone rubber matrix instead of or in addition to true molecular mixing. The grain size if real appeared finer that in sample 1.C above.

D. Washed Silicone Rubber Control.

A 2.54 cm silicone rubber square was soaked in ~250 ml of Freon® 113 with magnetic stirring, the Freon® 113 being changed for fresh Freon® 113 four times over six days. After thorough drying under nitrogen, the square was found to weigh 1.5 g and to measure 2.54 cm by 2.54 cm by 1.59 mm.

Contact Angle, $H_2O$=96+/-2°

X-ray Fluorescence: 0.41% F; 19.9% Si; 0.35% Fe

Shore D Hardness, ASTM D2240: 25±1

E. Untreated Silicone Rubber Control.

A 2.54 cm square of starting silicone rubber, untreated in any way was subjected to several of the same analyses. This square measured 2.54 cm by 2.54 cm by 1.61 mm and weighed 1.6 g.

Contact Angle, $H_2O$=90+/-1°

Weight Gain, 2 h @ r. t., n-butylamine=84%

Weight Gain, 168 h @ r. t. n-butylamine=230% badly cracked

Weight Gain, 2 h @ r. t, toluene=81%

X-ray Fluorescence: 18.8% Si, 0.34% Fe

Shore D Hardness, ASTM D2240: 23±3

The polymer showing the greatest pickup of PTFE (Example 1B, 56 wt %) was both washed and preswollen to ~2.7× its original weight with Freon® 113. The polymer showing an intermediate PTFE pickup (Example 1C, 13 wt %) was preswollen to 2.6× its original weight with Freon® 113 but not washed. And, the polymer showing the least PTFE pickup (Example 1A, 6 wt %) was washed but not preswollen. Between the various methods of treatment and conditions, it should be possible to tailor weight percent of PTFE and perhaps its distribution within the silicone rubber for various applications.

As PTFE content increased, the silicone rubber samples wet less readily with water, became harder, and became less subject to swelling and degradation by solvents. It is likely that the PTFE polymerized into a silicone rubber here could double as a filler and stiffener.

F. DSC Analysis of PTFE/Silicone Rubber:

Differential scanning calorimetry (DSC) was used to compare the silicone squares of Examples 1A, B, and C with a fresh, untreated silicone rubber square. In each case a razor blade was used to slice the skin off the square. The surface skins and resulting inner cores were then sent separately for DSC analysis. All samples were given two heats. The first heat, from -150 to 100° C. at 10° C./min under $N_2$, was used to establish a standard thermal history without degrading the silicone rubber. The second heat, from -150 to 500° C. at 10° C./min under $N_2$ was then used to collect data for the table below, giving the glass transition temperature, Tg, for the silicone rubber portion of the sample and the melting temperature, Tm, for any PTFE crystallites embedded in the sample. Results are shown in Table 1.

TABLE 1

| Silicone Sample | Wt. % PTFE | Surface Skins Silicon Tg | Surface Skins PTFE Tm | Inner Core Silicon Tg | Inner Core PFTE Tm |
|---|---|---|---|---|---|
| Untreated | None | -108° C. | — | -108° C. | — |
| Ex. 1.A | 6% | -101° C. | 323° C. 1.9 J/g | -107° C. | N.D. |
| Ex. 1.C | 13% | -109° C. | 324° C. 5.2 J/g | N.D. | 325° C. 12 J/g |
| Ex. 1.B | 56% | -113° C. | 328° C. 20 J/g | -98° C. | 329° C. 20 J/g |

TABLE 1-continued

| Silicone Sample | Wt. % PTFE | Surface Skins Silicon Tg | Surface Skins PTFE Tm | Inner Core Silicon Tg | Inner Core PFTE Tm |
|---|---|---|---|---|---|

N.D. Not detected
J/g Heat of fusion in Joules/gram

Silicone rubber squares containing from 6 to 37 wt % PTFE were tested. Considering that as-polymerized, pure PTFE has a melting endotherm of >70 Joules/gram, all four samples contain enough PTFE to show detectable PTFE 5 melting endotherms. While all skin samples indeed showed a typical PTFE melting endotherm between 323 and 328° C., the heats of melting were always less than would be expected from a mechanically mixed PTFE/silicone rubber mixture of the same composition. Silicone sample 1.A containing 6 wt % PTFE showed a very weak melting endotherm for PTFE in the skin but not in the core. Example 1.C containing 13 wt % PTFE shows PTFE melting points in both skin and core. Consistent with earlier electron microscopy that found about twice as much PTFE in the core of this sample as near the surface, the heat of PTFE melting is about twice as great in the core as in the skin. Example 1.B containing 56 wt % PTFE also shows PTFE melting points in both skin and core. Consistent with earlier electron micrographs that found roughly equal amounts of PTFE in skin and core for this sample, the heat of PTFE melting is about 20 J/g for each.

EXAMPLE 2

Red Silicon Rubber with PTFE

Physical Evidence that PTFE Penetrated into Silicone

Effect on Tack and Thermal Stability

A crosslinked poly(dimethylsiloxane) believed to contain iron oxide and silica as pigment/filler was used.

A. Preparation of Network, 86% PTFE Weight Gain.

Four red silicone rubber squares 2.5 cm by 2.5 cm by 1.52 mm thick and weighing 1.55 g on average were soaked for 65 h at RT in Freon® 113, increasing average weight to 4.85 g. The swollen squares were soaked for 15 minutes at -15° C. in 0.16 M HFPOdP in $CF_3CF_2CF_2OCFHCF_3$. The four squares were loaded into a prechilled 400 ml stainless steel autoclave. The autoclave was chilled, evacuated, filled with 25 g of TFE, and heated four hours at 30° C. with shaking, TFE pressure in the tube dropping from a maximum of 924 kPa at 8° C. on warming up to 393 kPa at 30° C. at the end of the run. The silicone rubber squares came back encrusted with white PTFE and weighed an average of 3.38 g fresh out of the tube and 3.07 g after drying under vacuum. The white crust was easily removed with a spatula giving back red silicone rubber squares with a some white patches on the surface (average weight now 2.88 g for an average weight gain of 86%). The squares are no longer entirely flat and measure ~2.8 cm by 2.8 cm by 1.91–2.03 mm thick.

B. Physical Evidence that PTFE Penetrated into Silicone.

One of the silicone rubber squares prepared in Example 2A, weighing 2.9788 g, was aggressively abraded with a wet Brillo® scrubbing pad for about 5 min with the intention of removing the upper layer of rubber. The square was rinsed with water, acetone, Freon® 113, and vacuum dried. Its weight was now 2.9223 g, its surface had a dull red/gray appearance, and water beaded on the surface with a contact angle of 123° C.

C. Effect on Tack and Thermal Stability.

Three of the squares prepared in part A above were stacked on top of each other and then placed between two glass microscope slides with a ~120 g weight on top. The assembly was then transferred to an oven under $N_2$, heated for 2 to 3 h, taken out, and examined. When 220° C. was reached distinct but weak bonding between the silicone rubber was observed. By 360° C. strong bonding was noted at isolated points between the various squares, but they could still be pulled apart whole and were still strong and flexible.

A control experiment was run simultaneously in the same oven with a set of three untreated, starting silicone rubber squares containing no PTFE. By 360° C. these squares were stuck together strongly enough that some rubber tearing was required for separation. Unlike the squares with PTFE, the untreated silicone rubber squares were brittle, showing little strength and crumbling upon bending.

EXAMPLE 3

Silicone Rubber with PTFE

High Molecular Weight Initiator May Affect PTFE Distribution

A crosslinked poly(dimethylsiloxane) believed to contain iron oxide and silica as pigment/filler was used. Two red silicone rubber squares 1.50–1.55 mm thick and weighing 1.2632 g on average were soaked overnight at room temperature in Freon® 113, increasing average weight to 3.9480 g. The swollen squares were soaked for 15 minutes at −15° C. in a 0.04 M HFPO oligomer peroxide, $\{CF_3CF_2CF_2O[CF(CF_3)CF_2O]_{11}CF(CF_3)(C=O)O—\}_2$, solution in Freon® 113. The two squares were loaded into a prechilled 400 ml stainless steel autoclave. The autoclave was chilled, evacuated, filled with 25 g of TFE, and heated four h at 30° C. with shaking, TFE pressure in the tube dropping from a maximum of 924 kPa at 15° C. on warm-up to 296 kPa at 30° C. at the end of the run. The silicone rubber squares weighed an average of 3.0929 g fresh out of the tube and were encrusted with white PTFE that had a curious fibrilar appearance. Drying under vacuum reduced average weight to 2.3429 g and rubbing off loose PTFE with a spatula to 1.9751 g. The PTFE deposits at the edges of the silicone rubber squares were still massive and could only be forcibly removed with the tearing occurring in the silicone rubber rather than in the PTFE edge deposits. In from the edges the silicone squares measured 1.52–1.57 mm thick and had a flexible feel much like the starting samples.

The sample was cross sectioned and analyzed for fluorine in the energy dispersive mode. Sharp spikes in relative fluorine concentration were apparent at both surfaces. The depth of the fluorine rich layer was about 7 $\mu$m. The initiator is a mix of oligomers. It is speculated that the lower oligomers readily penetrated the silicone rubber producing initiation throughout the bulk while the higher oligomers of the initiator penetrate the silicone rubber poorly, confining their initiation of polymerization to the uppermost surface.

EXAMPLE 4

Silicon Rubber O-Ring with Interpenetrating PTFE

Reduced Sliding Friction

Two #214 red silicone rubber o-rings (obtained from McMaster-Carr Supply Company, P. O. Box 440, New Brunswick, N.J., #9396K35) weighing 1.1705 g on average were soaked for 1 h at RT in Freone 113, increasing average weight to 2.799 g. The swollen o-rings were soaked for 15 min at −15° C. in a 0.17 M HFPO oligomer peroxide, $\{CF_3CF_2CF_2O[CF(CF_3)CF_2O]_{11.2}CF(CF_3)(C=O)O—\}_2$, solution in Freon® and then loaded into a prechilled 400 ml stainless steel autoclave. The autoclave was chilled, evacuated, filled with 25 g of TFE, and heated four h at 40° C. with shaking, TFE pressure in the tube dropping from a maximum of 1.20 MPa at 7° C. on warm-up to 572 kPa at 40° C. at the end of the run. The o-rings weighed an average of 1.5687 g fresh out of the tube and were encrusted with a white PTFE. Drying under vacuum reduced average weight to 1.4648 g and rubbing off loose PTFE with a spatula to 1.197 g for a 2.3% weight gain.

| | |
|---|---|
| Sliding Force Vs. Polished Steel: | 0.12 kg starting |
| | 0.068 kg average |

For control experiment purposes, an untreated silicone o-ring was subjected to the same sliding force measurements.

| | |
|---|---|
| Sliding Force Vs. Polished Steel | 0.52 kg starting |
| | 0.54 kg average |

EXAMPLE 5

Viton® Fluoroelastomer with PTFE

A. Untreated Viton® Control (E89900-37).

A #214 Viton® fluoroelastomer o-ring (obtained from McMaster-Carr Supply Company, P. O. Box 440, New Brunswick, N.J., #9464K35) was tested without treatment of any sort.

| | |
|---|---|
| Sliding Force Vs. Polished Steel: | 0.56 kg starting |
| | 0.59 kg average |
| | 0.61 kg average peaks |
| | 0.51 kg average valleys |

For control experiment purposes, a #214 Viton® o-ring was scoured for ~5–10 minutes with a damp Brillo® pad losing 0.003 g and friction measurements 15 taken again.

| | |
|---|---|
| Sliding Force Vs. Polished Steel | 0.44 kg starting |
| | 0.56 kg average |
| | 0.57 kg average peaks |

B. Brief Soak of Viton® in Initiator Solution, 0.8% Weight Gain.

Five #214 Viton® o-rings weighing an average of 1.6473 g apiece were rinsed with Freon® 113 and air dried overnight. After soaking for 5 minutes at −15° C. in ~0.16 M HFPOdP in $CF_3CF_2CF_2OCFHCF_3$, these o-rings were briefly air dried, chilled on dry ice, and loaded into a 400 ml prechilled autoclave. The autoclave was evacuated, loaded with 15 g TFE, shaken, and heated for ~4 h at 30° C. Fresh out of the autoclave the o-rings appeared lightly dusted with white PTFE and weighed an average of 1.7397 g apiece. The o-rings were devolatilized under vacuum and loose PTFE rubbed off. They now had a dappled black/white surface and weighed on average 1.6598 g for an average weight gain of 0.8%. Sliding force versus steel was ~⅙th that of untreated control Viton®.

| Sliding Force Vs. Polished Steel: | 0.16 kg starting |
| --- | --- |
| | 0.089 kg average |
| | 0.092 kg average peaks |
| | 0.087 kg average valleys |

One of the o-rings was scoured for ~5–10 min with a damp Brillo® pad losing 0.008 g and friction measurements made again.

| Sliding Force Vs. Polished Steel | 0.27 kg starting |
| --- | --- |
| | 0.23 kg average |
| | 0.23 kg average peaks |

C. Brief Soak of Viton® in Initiator Solution, 1.7% Weight Gain.

Five #214 Viton® o-rings weighing an average of 1.6363 g apiece were rinsed with Freon® 113 and air dried overnight. After soaking for 1 min at −15° C. in 0.16 M HFPOdP in $CF_3CF_2CF_2OCFHCF_3$, these o-rings were briefly air dried, chilled on dry ice, and loaded into a 400 ml prechilled autoclave. The autoclave was evacuated and loaded with 15 g TFE. Warming towards 30° C. gave a brief exothermic excursion to 67° C., the clave eventually settling down to 69 kPa at 30° C. after a total reaction period of about 4 h. Fresh out of the autoclave the o-rings were crusted with white PTFE and weighed an average of 2.66 g apiece. The o-rings were devolatilized under vacuum and the white crust rubbed off. They now had a black/white dappled surface and weighed on average 1.664 g for an average weight gain of 1.7%. Sliding force versus steel was ~⅓th that of untreated control Viton®.

| Sliding Force Vs. Polished Steel: | 0.075 kg starting |
| --- | --- |
| | 0.043 kg average |
| | 0.045 kg average peaks |
| | 0.040 kg average valleys |

One of the o-rings was scoured for ~5–10 min with a damp Brillo® pad losing 0.02 g and friction measurements made again.

| Sliding Force Vs. Polished Steel | 0.24 kg starting |
| --- | --- |
| | 0.17 kg average |
| | 0.18 kg average peaks |
| | 0.16 kg average valleys |

D. Brief Soak of Viton® in Initiator Solution, 5% Weight Gain.

Five #214 Viton® o-rings weighing an average of 1.64 g apiece were rinsed with Freon® 113 and air dried overnight. After soaking for 15 min at −15° C. in ~0.16 M HFPOdP in $CF_3CF_2CF_2OCFHCF_3$, these o-rings were briefly air dried, chilled on dry ice, and loaded into a 400 ml prechilled autoclave. The autoclave was evacuated and loaded with 15 g TFE. Warming towards 30° C. gave a brief exothermic excursion to 40° C., the clave eventually settling down to 345 kPa at 30° C. after a total reaction period of about 4 h. Fresh out of the autoclave the o-rings were crusted with white PTFE and weighed an average of 3.18 g apiece. The o-rings were devolatilized under vacuum and the white crust rubbed off. They now had a black/dominant white dappled surface and weighed on average 1.73 g for an average weight gain of 5%. Sliding force versus steel was 1/12th that of untreated control Viton®.

| Sliding Force Vs. Polished Steel: | 0.080 kg starting |
| --- | --- |
| | 0.047 kg average |
| | 0.049 kg average peaks |
| | 0.046 kg average valleys |

One of the o-rings was scoured for ~5–10 min with a damp Brillo® pad losing 0.07 g and friction measurements made again.

| Sliding Force Vs. Polished Steel | 0.47 kg starting |
| --- | --- |
| | 0.49 kg average |
| | 0.47 kg average peaks |
| | 0.45 kg average valleys |

E. Swell Viton® First In $CF_3CFHCFHCF_2CF_3$, Then Brief Soak In 10 Initiator Solution, 22% Weight Gain.

Five #214 Viton® o-rings weighing an average of 1.64 g apiece were soaked for 1 hour at room temperature in $CF_3CFHCFHCF_2CF_3$ increasing average weight to 1.77 g. The o-rings were transferred from the pure $CF_3CFHCFHCF_2CF_3$ to ~0.16 M HFPOdP in $CF_3CFHCFHCF_2CF_3$ and left to soak an additional 15 minutes at −15° C. These o-rings were briefly air dried (now 1.78 g on average), chilled on dry ice, and loaded into a 400 ml prechilled autoclave. The autoclave was evacuated, loaded with 25 g TFE, shaken, and heated ~4 h at 30° C. during which period pressure dropped from 1.28 MPa to 903 kPa. Fresh out of the autoclave the o-rings appeared to have a light coating of fibrous white PTFE on the surface. The o-rings were devolatilized under vacuum and the loose polymer rubbed off. They now had a dominant gray/white dappled surface and weighed on average 2.01 g for an average weight gain of 22%. The polymer of the o-rings was stiffened considerably compared to the starting o-rings before any treatment. Sliding force versus steel was ~1/15th that of untreated control Viton®.

| Sliding Force Vs. Polished Steel: | 0.068 kg starting |
| --- | --- |
| | 0.039 kg average |
| | 0.041 kg average peaks |
| | 0.037 kg average valleys |

One of the o-rings was scoured for ~5–10 min with a damp Brillo® pad losing 0.05 g and friction measurements made again.

| Sliding Force Vs. Polished Steel | 0.059 kg starting |
| --- | --- |
| | 0.023 kg average |
| | 0.027 kg average peaks |
| | 0.023 kg average valleys |

F. Swell Viton® First In $CF_3CFHCFHCF_2CF_3$, Then Brief Soak In Initiator Solution, 37% Weight Gain.

Five #214 Viton® o-rings weighing an average of 1.65 g apiece were soaked overnight at RT in $CF_3CFHCFHCF_2CF_3$ causing noticeable swelling and an increase in average weight to 2.30 g. The o-rings were transferred from the pure $CF_3CFHCFHCF_2CF_3$ to ~0.16 M HFPOdP in $CF_3CFHCFHCF_2CF_3$ and left to soak an additional 15 min at –15° C. These o-rings were briefly air dried, chilled on dry ice, and loaded into a 400 ml prechilled autoclave. The autoclave was evacuated, loaded with 25 g TFE, shaken, and heated towards 30° C. Nine min after an exothermnic excursion during warm up had carried the clave to 44° C. at 1.74 MPa, pressure in the clave had dropped to 1.09 MPa at 42° C. and the clave was vented. Fresh out of the autoclave the o-rings appeared to have a largely black surface suggestive of minimal PTFE formation within the Viton®. But once the o-rings had been devolatilized under vacuum and the little bit of loose white PTFE rubbed off, their average weight was found to be 2.26 g for an average weight gain of 37%. In spite of the large weight gain, when cut with a razor, the cross section thereby created was visually identical to that of an untreated, virgin Viton® o-ring with no obvious graying or white spots. Sliding force versus steel was ~1/12th that of untreated control Viton®.

| Sliding Force Vs. Polished Steel: | 0.226 kg starting |
| --- | --- |
|  | 0.050 kg average |
|  | 0.052 kg average peaks |
|  | 0.049 kg average valleys |

One of the o-rings was scoured for ~5–10 min with a damp Brillo® pad losing 0.008 g and friction measurements made again.

| Sliding Force Vs. Polished Steel | 0.077 kg starting |
| --- | --- |
|  | 0.027 kg average |
|  | 0.032 kg average peaks |
|  | 0.027 kg average valleys |

The above results demonstrate that as little as 1.7 weight percent PTFE can achieve most of the friction lowering advantages. The optimum percent PTFE will probably vary with the particular polymerization conditions used since polymerization conditions in turn affect morphology and the extent to which the PTFE is deposited in the uppermost surface layers of the rubber versus within the bulk of the rubber.

The effects of abrading each of the o-rings tested for 5–10 minutes with a damp Brillo® pad are also apparent. The reduction in friction conferred by the PTFE is largely lost for O-rings containing ≦5 wt % PTFE but largely retained for o-rings containing ≧22 wt % PTFE. The way the o-ring with 5% PTFE was more strongly affected than the o-rings with only 0.8 and 1.7% PTFE is consistent with the belief that surface versus subsurface PTFE distribution plays an important role.

G. Distribution of Fluorine by Electron Microscopy.

The distribution of fluorine as seen by electron microscopy is not inconsistent with the frictional effects observed above. A Viton® o-ring that had picked up 38% by weight PTFE was cross sectioned and fluorine distribution measured by electron microscopy in energy dispersive mode. While relative fluorine concentration decreases steadily towards the interior of the o-ring (FIG. 1), the decrease in fluorine concentration appears too gradual for surface abrasion to have an immediate effect on frictional properties.

A Viton® o-ring that had picked up 0.8% by weight PTFE was cross sectioned and fluorine distribution measured by electron microscopy in energy dispersive mode. Surface fluorine concentration was indistinguishable from the bulk.

H. DSC Evidence for Interpenetrating Network Structure, PTFE/Viton®:

DSC was used to compare the o-rings of Examples 5C, D, E, and F with a fresh, untreated Viton® o-ring. In each case a razor blade was used to slice the outer skin off the o-ring. The surface skins and resulting inner cores were then sent separately for DSC analysis. All samples were given two heats. The first heat, from –50 to 100° C. at 10° C./min under $N_2$, was used to establish a standard thermal history without degrading the Viton®. The second heat, from –50 to 500° C. at 10° C./min under $N_2$ was then used to collect data for Table 1 below, giving the glass transition temperature, Tg, for the Viton® portion of the o-ring and the melting temperature, Tm, for any PTFE crystallites embedded in the Viton®.

TABLE 2

| O-Ring Sample | Wt. % PTFE | Surface Skins | | Inner Core | |
| --- | --- | --- | --- | --- | --- |
| | | Viton® Tg | PTFE Tm | Viton® Tg | PTFE Tm |
| Untreated | None | –18° C. | N.D. | –18° C. | N.D. |
| Ex. 5.C | 1.70% | –18° C. | 335° C. 2.5 J/g | –17° C. | N.D. |
| Ex. 5.D | 5 | –17° C. | 332° C. 2.0 J/g | –17° C. | N.D. |
| Ex. 5.E | 22% | N.D. | 332° C. 2.1 J/g | –6° C. | N.D. |
| Ex. 5.F | 37% | –34° C. | 327° C. 9.3 J/g | –33° C. | N.D. |

N.D. Not detected
J/g melting endotherm in DSC in Joules/gram

Viton® o-rings containing from 1.7 to 37 wt % PTFE were tested. Considering that as-polymerized, pure PTFE has a melting endotherm of >70 Joules/gram, all four samples contain enough PTFE to show detectable PTFE melting endotherms. While all skin samples indeed show a typical PTFE melting endotherm between 327 and 335° C., the heats of melting are often less than would be expected from a mechanical PTFE/Viton® mixture of the same composition. In contrast, none of the core samples showed any detectable PTFE melting point. At the very highest loading, 37 wt % PTFE, the Tg of the Viton® skin and core samples are simultaneously depressed 14 or 15° C. A PTFE/Viton® blend made by mechanical mixing would be expected have very different DSC characteristics. Both skin and core samples would have shown PTFE melting endotherms corresponding to PTFE crystallites. Given good mechanical mixing, heats of fusion for skin and core samples would have been identical and in direct proportion to PTFE concentration in the elastomer. And, Viton® Tg would have been unaffected.

EXAMPLE 6

Simple Atmospheric Pressure Process

Different PTFE Loadings in Same Reactor

Viton® Examples

A. Overnight Freon® 113 Soak, Brief Soak in Initiator, 2% PTFE Weight Gain.

Two #214 Viton® o-rings (obtained from McMaster-Carr Supply Company, P. O. Box 440, New Brunswick, N.J.) averaging 1.6399 g were soaked overnight in Freon® 113, and then for 15 min at –15° C. in 0.16 M HFPOdP solution. The o-rings were briefly air dried and then transferred to a gas sampling bag [SKC INC EIGHTY FOUR, Pa., #232-08, made of Tedlar® poly(vinyl fluoride)] measuring 53 cm×53 cm and provided with a needle valve. In order to prepare the bag for use, a lower corner was cut off and the bag was flushed with nitrogen. The two o-rings were inserted through the cut corner and the bag resealed by taping, turning over the corner a few times, and holding in place with clamps. The bag was evacuated, loosely inflated with tetrafluoroethylene and evacuated twice, and finally loosely inflated 5–8 cm high with tetrafluoroethylene for the run. During the next 2.5 h the bag and its contents were occasionally shaken to make sure the o-rings absorbed TFE uniformly. A haze of PTFE particulates could be seen on the walls of the bag about 45 minutes into the run and on the o-rings about 90 min into the run (it was hard to tell whether the white dusting on the o-rings were the direct result of polymerization or of contact with the dust on the walls of the bag). After 2.5 h total run time the o-rings were removed from the bag and found to weigh 1.7015 g on average. Once loose polymer had been wiped off the o-rings and the o-rings dried overnight under pump vacuum, they weighed 1.6769 g on average for a PTFE weight gain of 2.3%. At this point the o-rings were indistinguishable in visual appearance from untreated o-rings.

B. Grossly Preswell O-ring in $CF_3CFHCFHCF_2CF_3$, Brief Soak in Initiator, Simultaneous ~0.6% and 24% Weight Gains in Same Reactor.

Two #214 Viton® o-rings (obtained from McMaster-Carr Supply Company, P. O. Box 440, New Brunswick, N.J.) each weighing ~1.64 g were soaked overnight (~16 hours) in 0.16 M HFPOdP in Freon® E1. The first o-ring, was an untreated Viton® o-ring. The second Viton® o-ring had been presoaked for ~1 month at room temperature in $CF_3CFHCFHCF_2CF_3$ and was grossly swollen. This gross swelling persisted through the soak in the initiator solution all the way to the end of the experiment.

The o-rings were removed from the initiator soak, were briefly air dried, and then transferred to the same gas sampling bag used above in part A. The two o-rings were inserted through the cut corner and the bag resealed by taping, turning over the corner a few times, and holding in place with clamps. The bag was loosely inflated with $N_2$ and evacuated twice, loosely inflated with tetrafluoroethylene and evacuated twice, and finally loosely inflated 5–8 cm high with tetrafluoroethylene for the run. During the next 3 h the bag and its contents were occasionally shaken to make sure the o-rings absorbed TFE uniformly. By the end of the run, loose PTFE was on most surfaces. The o-rings were removed from the bag, the plain o-ring weighing 1.6790 g and the grossly swollen o-ring weighing 2.2437 g. Once loose polymer had been wiped off the o-rings and the o-rings dried overnight under pump vacuum, they weighed 1.65 g and 2.03 g respectively. The o-rings were indistinguishable in visual appearance from untreated o-rings.

EXAMPLE 7

Viton® with PTFE

Two #214 Viton® o-rings weighing an average of 1.644 g apiece were soaked overnight at room temperature in Freon® 113 causing an increase in average weight to 1.822 g. The o-rings were transferred to a solution of 0.05 M isobutyryl peroxide in Fluorinert® FC-75 (3M Industrial Chemical Products Division) and left to soak 10 min at −15° C. These o-rings were briefly air dried, chilled on dry ice, and loaded into a 400 ml prechilled autoclave. The autoclave was evacuated, loaded with 25 g TFE, shaken, and heated at 60° C. for 4 hours, pressure in the autoclave dropping from 1.65 to 1.39 MPa. Fresh out of the autoclave the o-rings had a light dusting of PTFE and weighed 1.7627 g. The o-rings were devolatilized under vacuum (1.7478 g) and the PTFE dusting wiped off with a tissue further reducing weight to 1.7419 g (6% weight gain) and returning the o-rings to their original appearance.

EXAMPLE 8

Chemraz® with PTFE

Two #214 Chemraz® 505 o-rings (obtained from Greene, Tweed & Co, Detwiler Rd, Kulpsville, Pa.) were rinsed with Freon® 113, air dried overnight, and weighed 1.7367 g and 1.7276 g. The were soaked for 15 min at −15° C. in a 0.16 M solution of HFPOdP initiator in Freon® E1. The o-rings were briefly air dried, chilled on dry ice, and loaded into a 400 ml prechilled autoclave. The autoclave was evacuated, loaded with 10 g of TFE, shaken, and heated for ~4 h at 30° C. causing the pressure in the autoclave to drop from 579 to 400 kPa. Fresh out of the autoclave the o-rings had a pebbly gray appearance with a little loose PTFE attached as well. Knocking off the loose PTFE, the two o-rings weighed 2.0799 g and 2.0939 g for 20 and 21% weight gains respectively. This shows that weight gain is reasonably uniform if one keeps track of individual o-rings.

The Chemraz® o-ring showing a 20% weight gain was cross sectioned. Scanning electron microscopy found a distinct ring structure in the interior of the o-ring that was not present in an untreated Chemraz® o-ring taken from the same batch. Scanning for fluorine concentration across the cross section in EDS mode (Energy Dispersive Spectroscopy),there is a maximum in fluorine concentration at the surface, a second maximum in fluorine concentration at the inner ring structure about 300 $\mu$ in from the surface, and a minimum in fluorine concentration at the center.

EXAMPLE 9

Simultaneous Treatment of Different Rubbers

Simple Atmospheric Pressure Process

One #214 Viton® o-ring (obtained from McMaster-Carr Supply Company, P. O. Box 440, New Brunswick, N.J.) weighing 1.6596 g was soaked overnight in $CF_3CFHCFHCF_2CF_3$ (increasing weight to 2.3075 g) and then for 1 min at −15° C. in a $CF_3CF_2CF_2OCFHCF_3$ solution 0.16 M in HFPOdP. One #214 Chemraz® 505 o-ring (obtained from Greene, Tweed & Co, Detwiler Rd, Kulpsville, Pa.) weighing 1.7348 g was soaked overnight in $CF_2ClCFCCl_2$ (increasing weight to 2.5061 g) and then for 1 min at −15° C. in a $CF_3CF_2CF_2OCFHCF_3$ solution 0.16 M in HFPOdP. One #214 Fluorel® o-ring (obtained from Greene, Tweed & Co, Detwiler Rd, Kulpsville, Pa.) weighing 1.5797 g was soaked overnight in $CF_3CFHCFHCF_2CF_3$ (increasing weight to 2.0800 g) and then for 1 min at −15° C. in a $CF_3CF_2CF_2OCFHCF_3$ solution 0.16 M in HFPOdP.

Upon removal from the HFPOdP solution, all three o-rings were briefly air dried and then transferred to a Tedlar® gas sampling bag measuring 18.5 cm×15.2 cm (SKC INC EIGHTY FOUR, Pa., #231-938), and provided with a needle valve. The bag was clamped shut, loosely inflated with $N_2$/evacuated twice, loosely inflated with tetrafluoroethylene/evacuated twice, and finally loosely inflated and left inflated with tetrafluoroethylene for the run. The bag and its contents were allowed to stand overnight at room temperature with a shake or two when convenient to help insure uniform polymerization. Except for a dusting of loose PTFE, the o-rings came back with a visual appearance much like at the start. Drying under vacuum and wiping off loose TFE, the Viton® o-ring weighed 1.8862 g (a 14% weight gain), the Chemraz® o-ring 2.0396 g (an 18% weight gain), and the Fluorel® o-ring 1.7692 g (a 12% weight gain).

Friction measurements performed on the Chemraz® o-ring found:

| Sliding Force Vs. Polished Steel: | 0.072 kg starting |
| | 0.068 kg average |

For control experiment purposes, an untreated Chemraz® o-ring was subjected to the same sliding force measurements.

| Sliding Force Vs. Polished Steel | 0.63 kg starting |
| | 0.50 kg average |

EXAMPLE 10

Simultaneous Treatment of Different Rubbers

Simple Atmospheric Pressure Process

One #214 Viton® o-ring (obtained from McMaster-Carr Supply Company, P. O. Box 440, New Brunswick, N.J.) weighing ~1.64 g was soaked for a month in $CF_3CFHCFHCF_2CF_3$ (increasing weight to ~2.4 g) and then for 15 min at −15° C. in a $CF_3CFHCFHCF_2CF_3$ solution 0.16 M in HFPOdP. One #214 Chemraz® 505 o-ring (obtained from Greene, Tweed & Co, Detwiler Rd, Kulpsville, Pa.) weighing 1.76 g was soaked for 15 min at −15° C. in a $CF_3CFHCFHCF_2CF_3$ solution 0.16 M in HFPOdP. A ~2.5 cm square of silicone rubber 1.50 mm thick was soaked over the weekend in Freon® 113 and then for 15 min at −15° C. in a $CF_3CFHCFHCF_2CF_3$ solution 0.16 M in HFPOdP. A ~2.5 cm square of neoprene 2.13–2.24 mm thick was soaked for about 1 month in $CCl_2FCH_3$ and then for 15 min at −15° C. in a $CF_3CFHCFHCF_2CF_3$ solution 0.16 M in HFPOdP. For convenience all four rubber samples were soaked at the same time in the same 0.16 M HFPOdP solution.

Upon removal from the HFPOdP solution, all four rubber samples were briefly air dried and then transferred to a Tedlar® gas sampling bag (SKC INC EIGHTY FOUR, Pa., #232-08) 35 cm×53 cm, and provided with a needle valve. The four rubber samples were inserted through the cut corner and the bag resealed by taping, turning over the corner a few times, and holding in place with clamps. The bag was loosely inflated with $N_2$/evacuated twice, loosely inflated with tetrafluoroethylene/evacuated twice, and finally loosely inflated 5–8 cm high with tetrafluoroethylene for the run. During the next 5 h the bag and its contents were occasionally shaken to make sure the rubber samples absorbed TFE uniformly. The rubber samples were removed from the bag and examined. The Viton® o-ring weighed 2.0221 g after removal from the bag, 1.8815 g after devolatilization overnight under pump vacuum, and 1.8648 g (14% weight gain) after rubbing the loose PTFE off leaving a dull gray/black surface that was quite slippery to the touch. The Chemraz® o-ring weighed 1.9141 g after removal from the bag, 1.9076 g after devolatilization overnight under pump vacuum, and 1.8016 g (2.9% weight gain) after rubbing the loose PTFE off leaving a black surface. The silicone rubber square weighed 1.5468 g after removal from the bag, 1.5123 g after devolatilization overnight under pump vacuum, and 1.4740 g after rubbing the loose PTFE off leaving a muted red surface. The silicone rubber square measured 1.59 mm thick versus 1.51 mm thick for untreated silicone rubber sheet. Combustion analysis of the silicone rubber square found 0.96 wt % fluorine. The neoprene square weighed 1.9869 g after removal from the bag, 1.7984 g after devolatilization overnight under pump vacuum, and 1.6496 g after rubbing the loose PTFE off leaving a black surface. The Neoprene® rubber square measured 1.96–2.03 mm thick versus 2.13–2.24 mm thick for untreated neoprene rubber sheet suggesting that the long presoak in $CCl_2FCH_3$ washed significant material out of the rubber. The neoprene sample analyzed for 1.03 wt % fluorine by combustion analysis.

Compared to Viton® control (Example 5A above), the Viton® o-ring prepared here that contained 14 wt % PTFE showed reduced sliding friction:

| Sliding Force Vs. Polished Steel: | 0.091 kg starting |
| | 0.059 kg average |

EXAMPLE 11

Polymerization of PTFE into Uncrosslinked Fluoroelastomer

A. Autoclave Procedure.

A 11.4 cm length of uncured Chemraz® 505 preform (meant to be shaped into a part and crosslinked, with a diameter of 0.35 cm, obtained from Greene, Tweed & Co, Detwiler Rd, Kulpsville, Pa.) weighing 2.3199 g and a 12.1 cm length of uncured Fluorel® preform 0.37 cm in diameter (obtained from Greene, Tweed & Co, Detwiler Rd, Kulpsville, Pa.) and weighing 2.6509 g were rinsed with Freon® 113 and air dried overnight. The next morning the preforms were soaked for 15 minutes at −15° C. in a 0.16 M solution of HFPOdP initiator in Freon® E1. The o-rings were briefly air dried, chilled on dry ice, and loaded into a 400 ml prechilled autoclave. The autoclave was evacuated, loaded with 10 g of TFE, shaken, and heated for ~4 h at 30° C. causing the pressure in the autoclave to drop from 538 kPa at 7° C. on warm up to 248 kPa at 30° C. at the end of the run. Fresh out of the autoclave the o-rings were crusted white with PTFE. Drying overnight under vacuum, knocking the PTFE crust, rubbing off much of the remaining PTFE with a wet Brillo® pad, and weighing found a 19% weight gain for the Chemraz® preform and a 1.7% weight gain for the Fluorel® preform. Compared to the starting preforms, both preforms were now noticeably grayer in appearance as a result of surface PTFE deposits.

B. Low Pressure Procedure.

A 12.7 cm length of uncured Chemraz® 505 preform 0.35 cm in diameter (obtained from Greene, Tweed & Co, Detwiler Rd, Kulpsville, Pa.) weighing 2.7423 g and a 12.1 cm length of uncured Fluorel® preform 0.37 cm in diameter (obtained from Greene, Tweed & Co, Detwiler Rd, Kulpsville, Pa.) weighing 2.7375 g were rinsed with Freon® 113 and air dried overnight. The next morning the preforms were soaked for 1 min at −15° C. in a 0.15 M solution of HFPOdP initiator in Freon® E1. The o-rings were briefly air dried and then transferred to a 18.5 cm×15.2 cm Tedlar® gas sampling bag (SKC INC EIGHTY FOUR, Pa., #231-938)

provided with a needle valve. The bag was clamped shut, loosely inflated with $N_2$/evacuated twice, loosely inflated with tetrafluoroethylene/evacuated twice, and finally loosely inflated and left inflated with tetrafluoroethylene for the run. The bag and its contents were allowed to stand overnight at room temperature with a shake or two when convenient to help insure uniform polymerization. The recovered preforms were dried under vacuum overnight. After wiping off loose TFE, the Chemraz® o-ring weighed 2.8868 g (a 5% weight gain) and the Fluorel® preform 2.7484 g (a 0.4% weight gain).

EXAMPLE 12

Polymerization of PTFE into Buna-N

One #214 Buna-N o-ring (obtained from McMaster-Carr Supply Company, P. O. Box 440, New Brunswick, N.J., #9452K34) weighing 1.0374 g was soaked overnight in $CH_3Cl_2F$ (increasing weight to 1.6659 g) and then for 15 minutes at −15° C. in a $CF_3CF_2CF_2OCFHCF_3$ solution 0.16 M in HFPOdP.

Upon removal from the HFPOdP solution, the o-ring was briefly air dried and then transferred to a 18.5 cm×15.2 cm Tedlar® gas sampling bag (SKC INC EIGHTY FOUR, Pa., #231-938) provided with a needle valve. The bag was clamped shut, loosely inflated with $N_2$/evacuated twice, loosely inflated with tetrafluoroethylene/evacuated twice, and finally loosely inflated and left inflated with tetrafluoroethylene for the run. The bag and its contents were allowed to stand for 5–6 h at RT with a shake or two when convenient to help insure uniform polymerization. Except for a light coating of TFE, easily wiped off, the o-ring came back with a visual appearance much like at the start. Drying under vacuum and wiping off loose PTFE, the Buna-N o-ring weighed 1.1318 g (a 9% weight

| Sliding Force Vs. Polished Steel: | 0.45 kg starting |
| --- | --- |
| | 0.50 kg average |

For control experiment purposes, an untreated Buna-N o-ring was subjected to the same sliding force measurements.

| Sliding Force Vs. Polished Steel | 0.71 kg starting |
| --- | --- |
| | 0.59 kg average |

The Buna-N control o-ring and the o-ring with 9 wt % PTFE were both soaked in $CH_3CCl_2F$ for 114 h, picking up 101 and 105 wt % respectively of their starting weights of $CH_3CCl_2F$. The o-rings were dried under vacuum to near their starting weights and then soaked in n-butylamine for 22 h. The control o-ring picked up 69% of its weight of n-butylamine while the o-ring containing 9 wt % PTFE picked up 59% of its weight of n-butylamine.

EXAMPLE 13

Polymerization of PTFE into Polyurethane

Two #214 polyurethane rubber o-rings (obtained from McMaster-Carr Supply Company, P. O. Box 440, New Brunswick, N.J., #9558K35) weighing 1.1101 g on average were soaked overnight in $CH_3CCl_2F$ (increasing weight to 1.7764 g on average) and then for 15 min at −15° C. in a $CF_3CF_2CF_2OCFHCF_3$ solution 0.16 M in HFPOdP. Upon removal from the HFPOdP solution, the o-rings were briefly air dried and then transferred on dry ice to a prechilled 400 ml autoclave. The autoclave was evacuated, loaded with 25 g of TFE, shaken, and heated for ~4 h at 40° C. causing the pressure in the autoclave to drop from 1.28 MPa at 21° C. on warm-up to 1.14 MPa at 40° C. at the end of the run. The o-rings then weighed 1.4749 g on average. After drying under vacuum and knocking off loose PTFE, the polyurethane o-rings weighed 1.1473 g on average (a 3.3% weight gain). Visually the o-rings had a dull black appearance with occasional gray surface mottling.

EXAMPLE 14

Viton® with PTFE/PPVE

Two #214 Viton® o-rings (2.5 cm ID, 3.2 cm OD, 0.32 cm cross sectional diameter, obtained from McMaster-Carr Supply Company, P. O. Box 440, New Brunswick, N.J.) averaging 1.6375 g were soaked overnight in Freon® 113, and then for 15 min at −15° C. in 0.16 M HFPOdP solution. The two o-rings were briefly air dried, chilled on dry ice, and loaded into a 400 ml prechilled autoclave. The autoclave was evacuated, loaded with 25 g TFE and 3 g of perfluoro (propyl vinyl ether), shaken, and heated at 40° C. for 4 h, pressure in the autoclave dropping from 1.71 MPa to 1.68 MPa. The o-rings had a light dusting of TFE/perfluoro (propyl vinyl ether) copolymer and weighed on average 1.7308 g. The o-rings were devolatilized under vacuum (1.7102 g) and the TFE/perfluoro(propyl vinyl ether) copolymer dusting wiped off with a paper towel further reducing weight to 1.6832 g (2.7% weight gain) and returning the o-rings to their original appearance except a bit duller in appearance. The o-rings had a very slippery feel. The average sliding friction was 0.084 kg.

EXAMPLE 15

Viton® with PTFE/CTFE

Two #214 Viton® o-rings (obtained from McMaster-Carr Supply Company, P. O. Box 440, New Brunswick, N.J.) averaging 1.6517 g were soaked overnight in Freon® 113, and then for 15 min at −15° C. in 0.16 M HFPOdP solution. The two o-rings were briefly air dried, chilled on dry ice, and loaded into a 400 ml prechilled autoclave. The autoclave was evacuated, loaded with 10 g TFE and 10 g of chlorotrifluoroethylene, shaken, and heated at 40° C. for 4 h, pressure in the autoclave dropping from 1.74 MPa to 1.48 MPa. The o-rings were visually unchanged in appearance but weighed on average 1.7496 g. The o-rings were devolatilized under vacuum reducing weight to 1.7095 g (3% weight gain). The o-rings visually appeared much as at the start.

EXAMPLE 16

Five Viton® o-rings, (McMaster-Carr, #9464K35, size 214), were soaked for 1 h in various soaking solutions of Freon® E1 fluid in HFC-4310 listed in Table 1, below. The o-rings were then soaked for 15 minutes at −15° C. in 0.15 M HFPO dimer peroxide in Freon® E1. The o-rings were briefly air dried and transferred to a Tedlar® bag which had previously been purged with $N_2$. The bag was sealed and purged/evacuated 3 times with $N_2$ and 2 times with TFE. The bag was then filled with TFE and allowed to polymerize for at least 16 h. Finished o-rings were dried under high vacuum and wiped clean of excess PTFE before final weights were taken several weeks later. Results are given in Table 3. Weight percent PTFE gain may be somewhat high because solvent losses can continue for weeks, but the trends shown remain the same.

TABLE 3

Adjusted Percent PTFE Weight Gain in Viton ®

| a | START WT. (g) | % SOL GAIN | ADJ WT (g)* | % PTFE GAIN |
|---|---|---|---|---|
| 0% | 1.6457 | 8.45 | 1.6808 | 2.13 |
| 15% | 1.6490 | 6.75 | 1.6677 | 1.13 |
| 30% | 1.6466 | 4.29 | 1.6617 | 0.92 |
| 40% | 1.6645 | 3.46 | 1.6677 | 0.19 |
| 50% | 1.6405 | 2.97 | 1.6485 | 0.49 |
| 53% | 1.6481 | 2.97 | 1.6583 | 0.62 |
| 56% | 1.6449 | 2.74 | 1.6539 | 0.55 |
| 60% | 1.6457 | 2.27 | 1.6517 | 0.36 |
| 67% | 1.6433 | 2.26 | 1.6470 | 0.23 |
| 71% | 1.6490 | 2.26 | 1.6544 | 0.33 |
| 75% | 1.6433 | 1.41 | 1.6455 | 0.13 |
| 90% | 1.6421 | 1.21 | 1.6456 | 0.21 |
| 100% | 1.6462 | 1.03 | 1.6487 | 0.15 |

[a] Volume percent E1 in a mixture of E1 and $CF_3CFHCFHCF_2CF_3$
*weight after sitting 3 weeks

EXAMPLE 17

Polymerization of 11 Wt. % PTFE into Additive-Free Poly(HFP/VF$_2$)

Twenty grams of pelletized 60 wt % hexafluoropropylene/40 wt % vinylidene fluoride copolymer dusted with $BaSO_4$ were soaked for 1 h at −15° C. in 0.15 M HFPOdP in $CF_3CF_2CF_2OCFHCF_3$. The pellets were briefly air dried and then stored on dry ice until they could be loaded into a prechilled 400 ml autoclave. The autoclave was evacuated and filled with 5 g of tetrafluoroethylene. Shaking the contents of the autoclave for 8 hours at 30° C. caused pressure to drop from a maximum of 270 kPa observed during warm up to 34.5 kPa at the end of the run. The pellets now weighed 22.21 g and were visibly spotted with PTFE on the surface. Drying under vacuum reduced weight to 22.16 g for an 11% weight gain.

EXAMPLE 18

A Chemraz® 505 o-ring weighing 1.7348 g was soaked overnight at room temperature in $CF_2ClCCl_2F$ increasing its weight to 2.5061 g. The o-ring was next soaked for 1 minute at −15° C. in a 0.16 M HFPOdP initiator solution in $CF_3CF_2CF_2OCFHCF_3$. The o-ring was taken out of the initiator solution, briefly air dried and loaded into a 18.5 cm×15.2 cm Tedlar® sampling bag (SKC Inc., Eighty-Four, Pa. #231-938). The bag was clamped shut and then evacuated and filled repeatedly, 2× with $N_2$ and 2× with TFE. The bag was loosely inflated with TFE and let stand overnight at room temperature. The Chemraz® o-ring, weighed 2.0396 g after drying overnight under vacuum for a ~18% weight gain. While there were no obvious PTFE deposits on the surface of the o-ring, it was visibly larger than at the start and had a slick feel. Using a razor blade, the surface skin was cut away from the core and then both skin and core sent for separate DSC analyses along with skin and core samples cut from an untreated Chemraz® o-ring. The first heat, from −75 to 100° C. at 10° C./min under $N_2$, was used to establish a standard thermal history without degrading the Chemraz®. The second heat, from −75 to 500° C. at 10° C./min under $N_2$ was used to collect data for Table 4 below, giving the Tg, for the Chemraz® portion of the o-ring and the Tm, for any PTFE crystallites embedded in the Chemraz®.

TABLE 4

| | | Surface Skin | | Inner Core | |
|---|---|---|---|---|---|
| O-Ring Sample | Wt. % PTFE | Chemraz ® Tg | PTFE Tm | Chemraz ® Tg | PTFE Tm |
| Untreated | None | −18° C. | N.D. | −18° C. | N.D. |
| Treated | 18% | −19° C. | 322° C. 4 J/g | −19° C. | N.D. |

N.D. Not detected
J/g Heat of fusion in Joules/gram

PTFE crystallites were detected in the skin but not in the core. The 4 J/g heat of fusion for the crystallites in the skin was less than the >12 J/g expected for an 18% PTFE/82% Chemraz® mechanical mixture, assuming any PTFE crystallites would have had a heat of fusion of 70 J/g. Both skin and core showed a 1° C. depression in the Chemraz® Tg.

EXAMPLE 19

Polymerization of TFE into Uncrosslinked Poly (TFE/PMVE) Gum Rubber

One hundred grams of coarsely ground Kalrez® 6000 [Kalrez® is a copolymer of TFE and perfluoromethylvinyl ether and a small amount of curesite monomer, available from DuPont-Dow Elastomers, Wilmington, Del., U.S.A.] crumb was soaked for 15 min at −15° C. in 0.16 M HFPOdP in Freon® E1. Excess initiator solution was decanted and the crumb air dried for ~1 min. The crumb was loaded into a Tedlar® bag fitted with a gas valve. The bag was clamped shut, evacuated/purged ten times with $N_2$, and two times with TFE. The bag was then loosely inflated with TFE and a thermocouple placed under the bag. Temperature at the thermocouple rose rapidly to 32° C. About 7 h were required for the thermocouple to return to 24° C. Several TFE refills were needed in the first h of reaction. The bag was left under TFE pressure overnight. The polymer was recovered the next morning, and although largely unchanged in appearance from dry starting material, weighed 191 grams. Drying for 13 days under pump vacuum at RT reduced weight to 111.2 grams. Further drying overnight at 150° C. in a nitrogen-purged vacuum oven reduced weight to 109.5 g for 9.5% weight gain versus dry starting polymer.

EXAMPLE 20

Polymerization of TFE into Uncrosslinked Viton® A-200 Gum Rubber

A. 48% Weight Gain:

Viton® A-200 pellets (20.1 g, Viton® A types are copolymers of vinylidene fluoride and hexafluoropropylene) were soaked for four days at room temperature in $CF_3CFHCFHCF_2CF_3$, increasing in weight to 60.7 g. The pellets were next soaked for 24 h at −15° C. in 0.15 M HFPOdP in Freon® E1, briefly air dried, and transferred to a Tedlar® bag equipped with a gas value. The bag was clamped shut, evacuated/purged 3× with $N_2$ and 2× with TFE, and inflated with TFE. The bag had to be reinflated with TFE repeatedly over the next 6 h. The bag was left inflated with TFE overnight. The next morning the pellets were recovered and dried for 17 h in a 150° C. vacuum oven with a nitrogen bleed. The polymer weighed 29.8 g for a 48% weight gain relative to starting polymer.

B. 19% Weight Gain:

Viton® A-200 pellets (100.7 g) were soaked for two days at RT in $CF_3CFHCFHCF_2CF_3$, increasing in weight to 296.3 g. The pellets were next soaked for 16 h at −15° C. in 0.14 M HFPOdP in Freon® E1, briefly air dried, and transferred to a Tedlar® bag equipped with a gas value. The bag was clamped shut, evacuated/purged 3× with $N_2$ and 2× with TFE, and inflated with TFE. A thermocouple was placed under the bag. For the first hour, the bag was refilled every 20 minutes and the thermocouple read 30° C. For the second hour the thermocouple read 29° C. and after that the polymerization noticeably slowed. The bag was left inflated with TFE overnight. The next morning the pellets were recovered weighing 289 grams. Drying overnight in a 150° C. vacuum oven provided with a nitrogen bleed reduced polymer weight to 119 g for a 19% weight gain.

C. 1.7% Weight Gain:

Viton® A 200 pellets (20.0 g) were soaked for one hour at room temperature in a 1:1 (v/v) mixture of Freon® E1 with $CF_3CFHCFHCF_2CF_3$, increasing in weight to 21.0 g. The pellets were then soaked for 1 hour at −15° C. in 0.14 M HFPOdP in Freon® E1, briefly air dried, and transferred to a Tedlar® bag equipped with a gas valve. The bag was clamped shut, evacuated/purged 3× with $N_2$ and 2× with TFE, inflated with TFE, and then left at room temperature for 72 h. The pellets were recovered, weighing 21.3 g. Drying for 7 h in a 150° C. vacuum oven provided with a nitrogen bleed reduced polymer weight to 20.4 g for a 1.7% weight gain.

EXAMPLE 21

Polymerization of TFE into Uncrosslinked Poly (TFE/PMVE) Gum Rubber

One hundred grams of coarsely ground Kalrez® 6000 crumb were soaked for 15 min at −15° C. in 0.15 M HFPOdP in Freon® E1. Excess initiator solution was decanted and the crumb air dried for ~1 min. The crumb was loaded into a Tedlar® bag fitted with a gas valve. The bag was clamped shut, evacuated/purged ten times with $N_2$ and two times with TFE. The bag was then loosely inflated with TFE and a thermocouple placed under the bag. Temperature at the thermocouple rose rapidly to 29° C. at which time the bag developed a leak. Making no effort to prevent exposure to the air, the Kalrez® crumb was transferred to a new bag. Temperature rose now to 28° C. for an hour before slowly dropping back to RT. The next morning the crumb weighed 144.3 g. Drying overnight in a 150° C. nitrogen purged vacuum oven reduced weight to 105.8 g for a 5.8% weight gain.

EXAMPLE 22

Polymerization of TFE into Uncrosslinked Viton® GF Gum Rubber

A. 6.6% Weight Gain:

Viton® GF (Viton® GF is a copolymer of vinylidene fluoride, hexafluoropropylene, TFE, and a small amount of a curesite monomer) pellets were soaked for 24 h at RT in 20 vol % $CF_3CFHCFHCF_2CF_3$/80 vol % Freon® E1, enough $CF_3CFHCFHCF_2CF_3$ to carry initiator deep into the Viton® pellets but not so much $CF_3CFHCFHCF_2CF_3$ that the Viton® pellets dissolve or fuse to a sticky mass. The swollen pellets were soaked for two days at −15° C. in 0.185 M HFPOdP in Freon® E1. The pellets were briefly air dried and transferred to a Tedlar® bag. The Tedlar® bag was purged/evacuated 3× with $N_2$ and 2× with TFE and finally inflated with TFE. A thermocouple placed under the bag read 29° C. for 1 h. After that the temperature slowly drifted back to RT. The bag was reinflated with TFE as necessary and left inflated with TFE overnight. The pellets, weighing 174 g, were dried overnight in a 150° C. vacuum oven with a nitrogen purge, reducing weight to 106.6 grams for a 6.6% weight gain relative to starting polymer. The pellets were slightly larger than at the start and retained their original shape.

B. 27% Weight Gain:

Viton® GF pellets (100 g) were soaked for 24 h at RT in 20 vol % $CF_3CFHCFHCF_2CF_3$/80 vol % Freon® E1, enough $CF_3CFHCFHCF_2CF_3$ to carry initiator deep into the Viton® pellets but not so much $CF_3CFHCFHCF_2CF_3$ that the Viton® pellets dissolved or fused to a sticky mass. The swollen pellets were soaked for 24 h at −15° C. in 0.185 M HFPOdP in Freon® E1. The pellets were briefly air dried and transferred to a 400 ml autoclave. The autoclave was cooled, evacuated, and filled with ~25 g of TFE. The contents of the autoclave were heated for 8 h at 30° C. The recovered pellets were visibly swollen and weighed 189 g. Drying 8 h under pump vacuum reduced weight to 171 g and further drying overnight at 150° C. under vacuum with a nitrogen bleed reduced weight to 127 g for a 27% weight increase. The pellets were noticeably larger than at the start.

C. 42% Weight Gain:

Viton® GF pellets (100 g) were soaked for 24 h at RT in 20 vol % $CF_3CFHCFHCF_2CF_3$/80 vol % Freon® E1, enough $CF_3CFHCFHCF_2CF_3$ to carry initiator deep into the Viton® pellets but not so much $CF_3CFHCFHCF_2CF_3$ that the Viton® pellets dissolved or fused to a sticky mass. The swollen pellets were soaked for 24 h at −15° C. in 0.18 M HFPOdP in Freon® E1. The pellets were briefly air dried and transferred to a 400 ml autoclave. The autoclave was cooled, evacuated, and filled with ~50 g of TFE. The contents of the autoclave were heated for 8 h at 30° C. Drying 8 hours under pump vacuum and further drying overnight at 150° C. under vacuum with a nitrogen bleed reduced weight to 142 g for a 42% weight increase. The pellets were now roughly ~9 mm in diameter compared to ~6 mm in diameter at the start.

D. Nonhomogeneous PTFE Distribution in 42% PTFE Pellets.

In part C above, Viton® GF pellets containing 42 weight percent PTFE were prepared. Over the course of polymerization and drying, the pellets changed from slightly translucent disks about 6 mm in diameter to opaque white disks about 9 mm in diameter. Several of these pellets were cut in half with a razor blade so as to expose round cross sections. Three concentric rings, arranged much like the layers of an onion, were easily visible in every case. These rings consisted of an opaque white outside crust, a milky to opaque white middle ring 2 to 2.5 mm across, and an inner core unchanged in appearance from starting Viton® GF and typically about 4 mm in diameter.

Thermogravimetric analysis (TGA) analysis was used to determine an approximate PTFE content for each ring. This was possible because both Viton® GF and PTFE volatilize ~100% under TGA conditions, but at very different temperatures. That is, Viton® GF weight loss occurs largely between 400° C. and 500° C. while PTFE weight loss occurs largely between 500° C. and 600° C., the two events being separated by a distinct plateau. A pellet was cut in half and small samples of crust, center ring, and core dissected out. TGA results are shown in Table 5, below.

TABLE 5[a]

| Sample | Wt Loss <500° C., Viton ® GF | Weight Loss >500° C., PTFE |
|---|---|---|
| White Outer Crust | 60% | 39% |
| Center Ring | 70% | 28% |
| Core | 84% | 16% |

[a]A Viton ® GF o-ring without PTFE analyzed as 99% Viton ® polymer and 0% PTFE

EXAMPLE 23

Polymerization of TFE into Kalrez® Preforms
A. Polyester Bag:

The full additive/crosslinking package used for the manufacture of Kalrez® was melt blended into Kalrez® crumb and a rough cylindrical part called a preform cut out before final molding and curing. A Kalrez® preform weighing 3.0148 g was soaked for 22 h in $CF_2ClCCl_2F$. The preform, now weighing 4.0698 g, was soaked for 1 h at −15° C. in initiator, a 0.165 M HFPOdP solution in Freon® E1 that had been put through a 0.45 μm filter. After brief air drying, the preform was weighed (4.7010 g) and transferred to a polyester bag (Kapak/Scotchpak, 16.5×20.3 cm, 0.051 mm thick film) fitted with a polypropylene gas inlet valve. The bag was clamped shut, evacuated/purged 3× with $N_2$ and 2× with TFE, and finally inflated with TFE. After 2 days at ambient temperature, a heavy PTFE coating had deposited on the walls of the bag as well as on the preform. Excess loose PTFE was wiped off the preform. After drying under pump vacuum overnight at RT, the preform weighed 3.8166 g for a 27% weight gain.

B. Polyethylene Bag:

The full additive/crosslinking package used for the manufacture of Kalrez® was melt blended into Kalrez® crumb and a rough cylindrical part called a preform cut out before final molding and curing. A Kalrez® preform weighing 2.7451 g was soaked for 5.5 h in $CF_2ClCCl_2F$. The preform was weighed (3.3032 g) and then soaked for 1 h at −15° C. in initiator, a 0.165 M HFPOdP solution in Freon® E1 that had been put through a 0.45 μm filter. After brief air drying, the preform weighed 3.8960 g and was transferred to a 20.3×25.4 cm Zip-lock® polyethylene bag (Brandywine Bag Company, part #301630) fitted with a polypropylene gas inlet valve. The bag was clamped shut, evacuated/purged 3× with $N_2$ and 2× with TFE, and finally inflated with TFE. After 2 days at ambient temperature, no significant PTFE deposits were visible either on the walls of the bag or the preform. After drying under pump vacuum overnight at RT, the preform weighed 3.8168 g for a 21% weight gain. In spite of the absence of visible PTFE on the o-ring, it had the desired slippery feel.

EXAMPLE 24

Polymerization of TFE into Kalrez® O-Rings

Eleven 2.54×3.18×0.64 cm Kalrez® o-rings were individually weighed. They were stacked one on top of another so as to maintain individual identity while soaking for 15 min at −15° C. in initiator, a 0.165 M HFPOdP solution in Freon® E1 that had been put through a 0.45 μm filter. The o-rings were briefly air dried while taking the time to thread them on a stiff Teflon® filament in the same order they had been stacked in the initiator solution. The o-rings now mounted on the filament were transferred to a Tedlar® bag equipped with a gas valve. The bag was clamped shut, evacuated/purged 3× with $N_2$ and 2× with TFE, and finally inflated with TFE. After 1 h the o-rings were recovered, coming out of the bag free of loose polymer, little changed visually, and slippery to the touch. After drying for 2 days under pump vacuum, the o-rings were reweighed. Table 6 lists individual weight gains in the same order that the o-rings were stacked one top of each another during the initiator soak step. O-Rings at the bottom of the stack showed less weight gain that those at the top of the stack in five out of six such runs.

TABLE 6

| Series | #1 | #2 | #3 | #4 | #5 | #6 |
|---|---|---|---|---|---|---|
| Initiator Soak | 15 min | 15 min | 30 min | 60 min | 60 min | 60 min |
| Polymerization Time | 1 h | 1.5 h | 18.5 h | 18 h | 18 h | 72 h |
| Bag Construction | Tedlar ® | Tedlar ® | Tedlar ® | Tedlar ® | PE* | PE* |
| PTFE Dust on O-Ring | No | Yes | Yes | Yes | No | No |
| Top of Stack | | | | | | |
| Wt. Gain Ring #1 | 2.1% | 2.3% | 4.4% | 4.2% | 3.7% | 3.9% |
| Wt. Gain Ring #2 | 2.0% | 1.6% | 4.5% | 4.3% | 3.7% | 3.9% |
| Wt. Gain Ring #3 | 2.1% | 1.7% | 4.5% | 4.6% | 3.7% | 3.8% |
| Wt. Gain Ring #4 | 2.0% | 1.8% | 4.5% | 4.3% | 3.6% | 3.7% |
| Wt. Gain Ring #5 | 2.1% | 3.1% | 4.4% | 4.2% | 3.6% | 3.7% |
| Wt. Gain Ring #6 | 1.8% | 2.0% | 4.4% | 4.4% | 3.4% | 3.6% |
| Wt. Gain Ring #7 | 1.8% | 2.4% | 4.4% | 4.1% | 3.4% | 3.5% |
| Wt. Gain Ring #8 | 1.7% | 1.2% | 4.5% | 3.8% | 3.3% | 3.3% |
| Wt. Gain Ring #9 | 1.8% | 2.5% | 4.2% | 3.9% | 3.1% | 3.3% |
| Wt. Gain Ring #10 | 1.6% | 2.5% | 3.7% | 3.4% | 3.1% | 3.2% |
| Wt. Gain Ring #11 | 1.4% | 2.4% | 3.1% | 2.9% | 2.9% | 3.0% |
| Bottom of Stack | | | | | | |
| Avg. PTFE Weight Gain | 1.9 ± .2% | 2.1 ± .5% | 4.2 ± .4% | 4.0 ± .5% | 3.4 ± .3% | 3.5 ± .3% |

*PE = Polyethylene bag

EXAMPLE 25

Polymerization of TFE into Kalrez® O-Rings
A. Using Fresh Initiator Solution:

Eleven Kalrez® o-rings measuring 2.54×3.18×0.32 cm were notched with a razor blade so their individual weights could be followed throughout the course of the experiment. The o-rings were placed in a 150 ml beaker equipped with a magnetic stir bar and chilled to 0° C. with a cooling bath. The beaker was filled with 60 ml of initiator solution, 0.15 M HFPOdP in Freon® E1 passed through an 0.45 μm filter. The contents of the beaker were stirred for 30 min at 0° C.

and then transferred to a Buchner filter (no filter paper, no vacuum). Excess initiator solution was allowed to drain though and saved for a later experiment (see part B below). The o-rings in the Buchner filter were briefly air dried by pulling a vacuum for 30 sec. The o-rings were then transferred to a 20.3×25.4 cm Zip-lock® polyethylene bag (Brandywine Bag Company, part number 301630) equipped with a gas inlet valve and the bag clamped shut. The bag was attached to a square wire frame attached in turn to an ordinary laboratory stirrer motor. The bag was evacuated/purged 3× with $N_2$ and 2× with TFE and finally inflated with TFE. Over the next 18 h, the bag and its contents were slowly tumbled using a stirrer motor mounted in a horizontal position. The o-rings were recovered and a small amount of loose PTFE dust wiped off. After drying for 3 days under pump vacuum, the o-rings were slippery to the touch and perhaps slightly gray compared to their appearance at the start. Reweighing individual o-rings showed an average weight gain of 2.16+/−0.14%, as shown in Table 7.

TABLE 7

| O-Ring | Starting Weight | Final Weight | PTFE Weight Gain |
| --- | --- | --- | --- |
| #1 | 1.7678 | 1.8031 | 2.0% |
| #2 | 1.7737 | 1.8110 | 2.1% |
| #3 | 1.7618 | 1.8019 | 2.3% |
| #4 | 1.7580 | 1.7987 | 2.3% |
| #5 | 1.7569 | 1.7985 | 2.4% |
| #6 | 1.7567 | 1.7952 | 2.2% |
| #7 | 1.7533 | 1.7884 | 2.0% |
| #8 | 1.7607 | 1.7980 | 2.1% |
| #9 | 1.7537 | 1.7938 | 2.3% |
| #10 | 1.7633 | 1.7983 | 2.0% |
| #11 | 1.7620 | 1.7986 | 2.1% |
| Average | | | 2.16 ± 0.14% |

B. Using Recovered Initiator Solution.

In part A above the initiator solution used to soak the o-rings was recovered in the Buchner filtration step. Iodometric titration found no decrease in initiator concentration, raising the issue of whether initiator solutions can be reused. Five more notched o-rings from the same stock were placed in the still cold, recovered initiator solution and again stirred for 30 min at 0° C. They were filtered off with the Buchner funnel, air dried for 30 sec, and transferred to their own polyethylene bag. The bag was inflated with TFE in the same fashion as for the eleven o-rings part A above, attached to the same frame as the first bag, and slowly tumbled for the same 18 h period. Upon recovery, the o-rings were unchanged in appearance and no loose PTFE deposits were observed on either the o-rings or the bag. After drying under pump vacuum for 3 days, the o-rings were examined and found to be slippery to the touch. Weight gains are shown in Table 8.

TABLE 8

| O-Ring | Starting Weight | Final Weight | PTFE Weight Gain |
| --- | --- | --- | --- |
| #1 | 1.7644 | 1.7844 | 1.1% |
| #2 | 1.7677 | 1.7882 | 1.2% |
| #3 | 1.7639 | 1.7855 | 1.2% |
| #4 | 1.7780 | 1.7988 | 1.2% |
| #5 | 1.7485 | 1.7719 | 1.3% |
| Average | | | 1.2 ± 0.070% |

What is claimed is:

1. A process for making a polymeric composition, comprising, diffusing into an elastomer a free radical initiator and at least one fluorinated olefin whose polymerization may be initiated by said free radical initiator, and heating said elastomer to cause initiation of polymerization of said fluorinated olefin.

2. The process as recited in claim 1 wherein said elastomer is crosslinked.

3. The process as recited in claim 1 wherein said elastomer is not crosslinked.

4. The process as recited in claim 1 wherein said elastomer is swollen before or during the time when said free radical initiator, or said fluorinated olefin, or said free radical initiator and said fluorinated olefin are diffused into said elastomer.

5. The process as recited in claim 4 wherein said heating is done when said elastomer is swollen.

6. The process as recited in claim 4 wherein said elastomer is swollen with a highly fluorinated liquid.

7. The process as recited in claim 1 wherein said elastomer is a fluorinated elastomer.

8. The process as recited in claim 7 wherein said elastomer is made from at least two of: vinylidene fluoride, hexafluoropropylene, tetrafluoroethylene, perfluoro(methyl vinyl ether), perfluoro(ethyl vinyl ether), perfluoro(propyl vinyl ether), vinyl fluoride, ethylene or propylene.

9. The process as recited in claim 7 wherein said fluorinated olefin is tetrafluoroethylene.

10. The process as recited in claim 1 wherein said fluorinated olefin is one or more of tetrafluoroethylene (TFE), hexafluoropropylene, vinylidene fluoride, chlorotrifluoroethylene, perfluo(propyl vinyl ether), perfluoro(methyl vinyl ether), perfluoro(ethyl vinyl ether), 3,3,3-trifluoropropene, or vinyl fluoride.

11. The process as recited in claim 1 wherein said fluorinated olefin is tetrafluoroethylene.

12. The process as recited in claim 1 wherein said polymerization is carried out in a bag.

13. A shaped part, comprising, an elastomer and a thermoplastic fluoropolymer, wherein a concentration of said thermoplastic in said elastomer changes as a distance from a surface of said shaped part increases, and wherein said thermoplastic fluoropolymer is about 0.1 to about 50 percent by weight of the total of said elastomer and said thermoplastic fluoropolymer in said shaped part.

14. The shaped part as recited in claim 13 wherein said thermoplastic fluoropolymer is polytetrafluoroethylene.

15. The shaped part as recited in claim 14 wherein said elastomer is made from: vinylidene fluoride, hexafluoropropylene and optionally tetrafluoroethylene; tetrafluoroethylene and perfluoro(methyl vinyl ether); tetrafluoroethylene and propylene.

16. The shaped part as recited in claim 13 wherein said elastomer is made from two or more of: vinylidene fluoride, hexafluoropropylene, tetrafluoroethylene, perfluoro(methyl vinyl ether), perfluoro(ethyl vinyl ether), perfluoro(propyl vinyl ether), vinyl fluoride, ethylene or propylene.

17. The shaped part as recited in claim 13 wherein said elastomer is crosslinked.

18. The shaped part as recited in claim 13 wherein said elastomer is not crosslinked.

19. A shaped part, comprising, an elastomer and thermoplastic fluoropolymer, said thermoplastic does not have a melting point when said melting point is measured by differential scanning calorimetry, or said melting point is shifted at least 30° C. from its value when measured on thermoplastic fluoropolymer alone, and provided that said elastomer is crosslinked.

20. A shaped part, comprising an elastomer and thermoplastic fluoropolymer in which said thermoplastic fluoropolymer is simultaneously present at a surface with a characteristic melting point, and is also present below the surface, wherein said thermoplastic fluoropolymer below the surface does not have a melting point when said melting point is measured by differential scanning calorimetry, or said melting point is shifted at least 30° C. from its value when measured on thermoplastic fluoropolymer alone, and provided that said elastomer is crosslinked.

21. A shaped part, comprising an elastomer and thermoplastic fluoropolymer, wherein a glass transition temperature of said elastomer is shifted at least 10° C. when compared to a glass transition temperature of said elastomer alone, and provided that said elastomer is crosslinked.

* * * * *